US010841651B1

(12) United States Patent
Karnezos et al.

(10) Patent No.: US 10,841,651 B1
(45) Date of Patent: Nov. 17, 2020

(54) SYSTEMS AND METHODS FOR DETERMINING TELEVISION CONSUMPTION BEHAVIOR

(71) Applicant: Facebook, Inc., Menlo Park, CA (US)

(72) Inventors: Timon Arya Karnezos, San Francisco, CA (US); Marco Antonio Matos, Seattle, WA (US); Nathan John Davis, Portola Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/728,778

(22) Filed: Oct. 10, 2017

(51) Int. Cl.
*H04N 21/442* (2011.01)
*H04N 21/466* (2011.01)
*H04N 21/4223* (2011.01)
*G06K 9/00* (2006.01)
*H04N 21/81* (2011.01)
*H04L 29/08* (2006.01)

(52) U.S. Cl.
CPC ... *H04N 21/44218* (2013.01); *H04N 21/4223* (2013.01); *H04N 21/4668* (2013.01); *G06K 9/00268* (2013.01); *H04L 67/22* (2013.01); *H04N 21/812* (2013.01)

(58) Field of Classification Search
CPC ....... H04N 21/44218; H04N 21/42204; H04N 21/4223; H04N 21/4668; H04N 21/812
See application file for complete search history.

(56) References Cited

U.S. PATENT DOCUMENTS

| 6,177,931 | B1 | 1/2001 | Alexander |
| 6,457,010 | B1 | 9/2002 | Eldering |
| 6,968,565 | B1 | 11/2005 | Slaney et al. |
| 7,047,554 | B1* | 5/2006 | Lortz ............... H04L 12/2803 375/E7.019 |
| 8,355,955 | B1 | 1/2013 | Mirchandani et al. |
| 2002/0072952 | A1* | 6/2002 | Hamzy ............. G06Q 30/0277 705/7.29 |
| 2003/0032409 | A1* | 2/2003 | Hutcheson ............ H04L 67/306 455/414.1 |
| 2005/0262535 | A1 | 11/2005 | Uchida |
| 2006/0026642 | A1 | 2/2006 | Schaffer |
| 2007/0104369 | A1* | 5/2007 | Weatherhead ..... G06Q 30/0242 382/181 |

(Continued)

OTHER PUBLICATIONS

U.S. Appl. No. 15/728,745, filed Oct. 10, 2017, Timon A. Karnezos.

(Continued)

*Primary Examiner* — James R Sheleheda
(74) *Attorney, Agent, or Firm* — Baker Botts L.L.P.

(57) ABSTRACT

In one embodiment, a method includes determining television content that a particular user is currently watching on a television. The method further includes determining, using one or more of a plurality of sensors, an attention level for the particular user. The attention level indicates an amount of attention paid by the particular user to the television content on the television. The method further includes determining, using one or more of the plurality of sensors, demographic information for the particular user. The method further includes storing the determined demographic information for the particular user and the particular user's attention level for the television content in the storage media.

13 Claims, 9 Drawing Sheets

(56) References Cited

U.S. PATENT DOCUMENTS

| | | |
|---|---|---|
| 2009/0089837 A1 | 4/2009 | Momosaki |
| 2009/0135303 A1 | 5/2009 | Sugiyama et al. |
| 2009/0198542 A1 | 8/2009 | D'Amore et al. |
| 2010/0107184 A1 | 4/2010 | Shintani |
| 2010/0179874 A1* | 7/2010 | Higgins ............ G06K 9/00664 705/14.53 |
| 2010/0211439 A1* | 8/2010 | Marci ............... H04N 21/4532 705/7.29 |
| 2010/0223641 A1* | 9/2010 | Hubbard ................ G06Q 30/02 725/35 |
| 2011/0010242 A1* | 1/2011 | Blaser ............... G06Q 30/0256 705/14.49 |
| 2011/0087534 A1 | 4/2011 | Strebinger et al. |
| 2012/0004983 A1* | 1/2012 | Borthwick ......... G06Q 30/0242 705/14.45 |
| 2012/0102008 A1 | 4/2012 | Kaariainen |
| 2012/0166520 A1* | 6/2012 | Lindsay ................ G06F 3/0488 709/203 |
| 2012/0240177 A1* | 9/2012 | Rose .................. H04N 21/4532 725/116 |
| 2012/0324027 A1* | 12/2012 | Vaynblat ................ G06F 16/22 709/206 |
| 2013/0006738 A1 | 1/2013 | Horvitz et al. |
| 2013/0117127 A1 | 5/2013 | Sosiak et al. |
| 2013/0117248 A1 | 5/2013 | Bhogal et al. |
| 2013/0124322 A1 | 5/2013 | Boland et al. |
| 2013/0132994 A1 | 5/2013 | Murphy et al. |
| 2013/0145385 A1 | 6/2013 | Aghajanyan et al. |
| 2013/0198383 A1* | 8/2013 | Tseng ................ H04L 61/6022 709/225 |
| 2013/0205314 A1* | 8/2013 | Ramaswamy ... H04N 21/44218 725/14 |
| 2013/0247081 A1 | 9/2013 | Vinson et al. |
| 2014/0067931 A1* | 3/2014 | Harik .................... G06Q 30/01 709/204 |
| 2014/0108501 A1 | 4/2014 | Papakipos |
| 2014/0149177 A1 | 5/2014 | Frank et al. |
| 2014/0278933 A1 | 9/2014 | McMillan |
| 2014/0317646 A1 | 10/2014 | De la Garza et al. |
| 2015/0100454 A1 | 4/2015 | Cook et al. |
| 2015/0227982 A1* | 8/2015 | Soupliotis .......... G06Q 30/0269 705/14.43 |
| 2016/0012475 A1 | 1/2016 | Liu |
| 2016/0037213 A1 | 2/2016 | Collins |
| 2016/0048869 A1* | 2/2016 | Shim .................. G06Q 30/0246 705/14.45 |
| 2016/0337701 A1* | 11/2016 | Khare ................ H04N 21/4667 |
| 2016/0357256 A1* | 12/2016 | Siefert ................. A61B 5/0205 |
| 2017/0027493 A1* | 2/2017 | Klin ..................... A61B 5/1103 |
| 2017/0061200 A1 | 3/2017 | Wexler et al. |
| 2017/0154356 A1 | 6/2017 | Trevisiol et al. |
| 2017/0161773 A1* | 6/2017 | Xu ............................ G06N 3/02 |
| 2017/0332121 A9 | 11/2017 | Bhatia et al. |

OTHER PUBLICATIONS

U.S. Appl. No. 15/728,756, filed Oct. 10, 2017, Timon A. Karnezos.
U.S. Appl. No. 15/728,767, filed Oct. 10, 2017, Timon A. Karnezos.
U.S. Appl. No. 15/728,792, filed Oct. 10, 2017, Timon A. Karnezos.
U.S. Appl. No. 15/728,801, filed Oct. 10, 2017, Timon A. Karnezos.

* cited by examiner

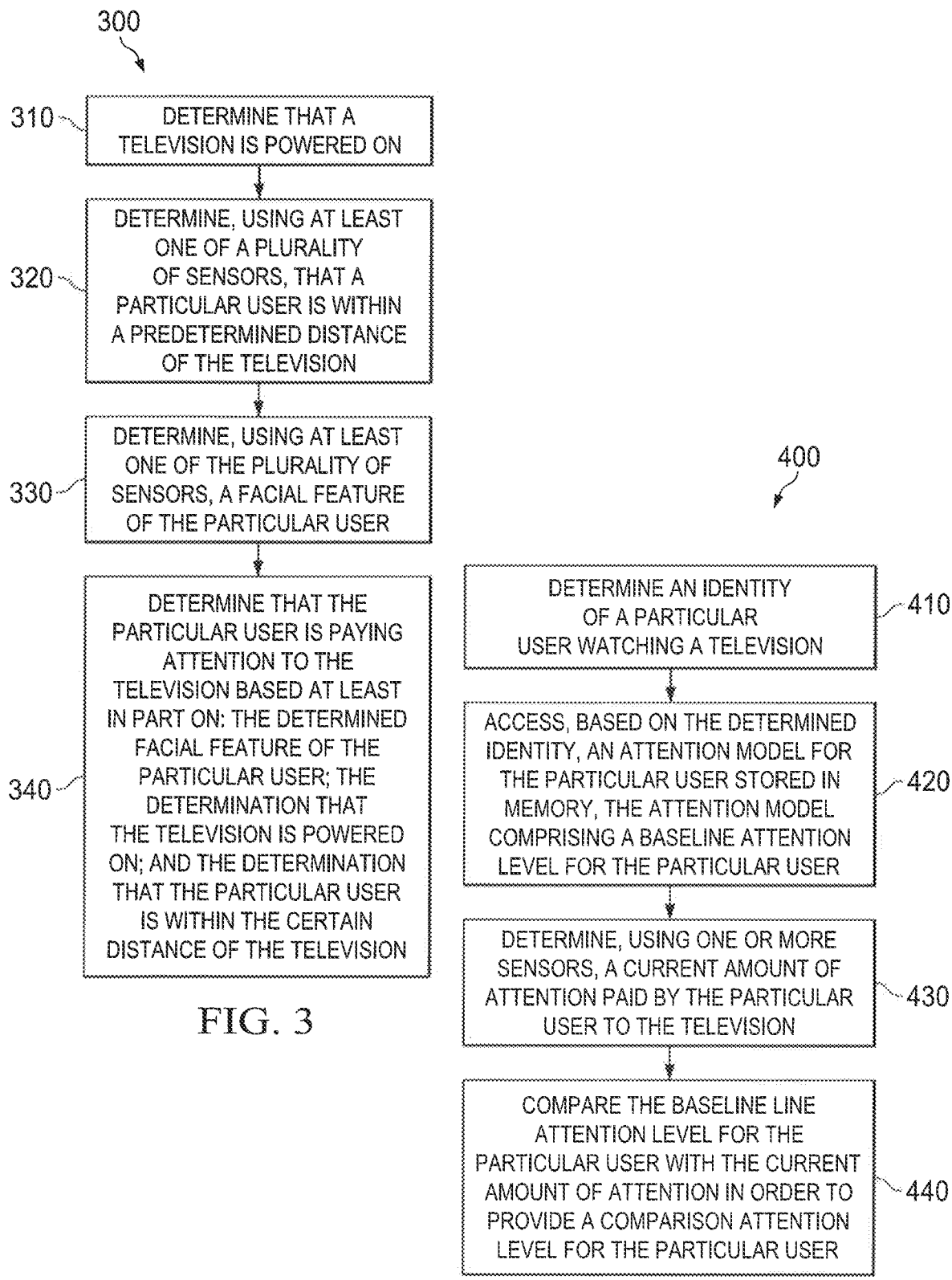

SYSTEMS AND METHODS FOR DETERMINING TELEVISION CONSUMPTION BEHAVIOR

TECHNICAL FIELD

This disclosure generally relates to television, and more particularly to systems and methods for determining television consumption behavior.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments provide enhanced insights into television consumption behavior by users by utilizing in-home "TV meter" devices. With user permission and subject to user privacy settings, a TV meter may be placed in close proximity to the primary television of a household in order to view the environment around the television. The TV meter device may utilize one or more sensors such as cameras and microphones to identify what content is being watched on the television, who is watching (i.e., the audience), and the amount of attention paid by the audience to the television. The amount of attention paid by the audience to specific television content (e.g., shows, commercials, etc.) may then be used to provide various insights into the television viewing behavior of users. As a result, third parties such as advertisers and television content providers may be able to have a clearer idea of which users are watching their content and how much attention they are paying to the content.

In some embodiments, the TV meter device determines a current attention level of users (e.g., quality and quantity) based on Boolean logic. For example, some embodiments determine conditions such as whether the television is powered on, whether a particular user is within a predetermined distance of the television, and certain facial features of the particular user. The facial features may include, for example, a direction in which the user is looking (e.g., a head pose) or whether the user's eyes are open. If certain of the determined conditions are met, the TV meter may consider the user paying attention to the television content. For example, if a head pose of the user is towards the television while it is on and the user is within a certain distance the television, the user may be determined to be paying attention to the television.

In some embodiments, personal attention models that are locally-stored on the TV meter may be used to determine relative attention levels for a user. In these embodiments, the TV meter may establish a baseline, average, or typical attention level for the user and store it in an attention model for the user in memory of the TV meter. The baseline attention model may then be used, along with a current attention level of the user, to determine a delta (e.g., an increase or decrease) attention level for the user. For example, the personal attention model for a user may be used to determine that the user is paying more attention to specific television content than is normal for the user.

In some embodiments, insights into attention levels for specific portions/segments of television content may be provided. For example, some embodiments of the TV meter determine what television content a particular user is currently watching. The TV meter may then determine a plurality of attention levels for the particular user that each indicate an amount of attention paid by the particular user to one a plurality of segments of the television content. The segments may be, for example, a duration of time within the television content (e.g., a specific second or minute of time) or a known event within the television content (e.g., the inclusion of a logo or item such as a puppy.) One or more insights may then provided that are based on the determined attention levels. For example, a provided insight might be: "The inclusion of a puppy in the eighth second of the commercial caused a peak in attention in audiences that was sustained throughout the commercial."

In some embodiments, product purchase attribution may be provided according to determined attention levels of users. For example, some embodiments of the TV meter may determine that a particular user watched an advertisement on a television for a particular product. The TV meter may determine how much attention the user paid to the advertisement and provide the attention information to a social-networking system. The social-networking system may determine that the particular user subsequently purchased the product of the advertisement and, if the attention information indicates that the particular user paid attention to the advertisement, the social-networking system may provide an attribution for the purchase of the product to the advertisement watched by the particular user on the television.

Some embodiments may provide planning products that are based on attention levels and demographic information determined by TV meters. For example, the TV meter may use facial recognition or image processing to determine that a particular user is a specific gender and age. The demographic and attention information from multiple TV meter devices may then be aggregated in order to provide planning products to particular third parties that indicate demographic and attention level information. For example, a provided insight might be: "You chose to advertise to males aged 18-34 in the past, but we recommend targeting females aged 35-60 in the future base on our analysis of user attention levels."

Some embodiments provide a comparison of the attention paid by a television audience to television content with attention paid to related digital content on a digital platform. For example, some embodiments of the TV meter may determine particular television content that a user is currently watching. For example, the TV meter may determine that the user is watching a specific show. The TV meter may then determine an attention level for the user for the specific show. A social-networking system may access the attention level for the specific show from multiple TV meters and aggregate the attention levels across multiple users. The social-networking system may also determine digital content that is available on the social-networking system that is related to the specific show (e.g., videos, pages, etc.). The social-networking system may then provide a comparison of the number of users who paid attention to the specific show on television with engagement on the social-networking system with the related digital content. A provided comparison may be, for example: "10,000 people viewed the advertisement on television and 8,000 people viewed the advertisement on the social-networking system."

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates an example method that may be utilized by the TV meter of FIG. 1 to determine attention levels of users.

FIG. 4 illustrates an example method of how the TV meter of FIG. 1 may use locally-stored attention models to determine attention levels of users.

DESCRIPTION OF EXAMPLE EMBODIMENTS

Analyzing viewership statistics for television content such as shows and advertisements is important for many different groups and industries. For example, advertisers desire an accurate picture of how many people are viewing particular television programs in order to decide which programs in which to place their advertisements. As another example, television networks desire accurate demographic data for television program viewership in order to determine programming lineups and schedules. Unfortunately, many existing methods of analyzing viewership of television content are inaccurate or incomplete. For example, many viewers record and view television programs at a later time after they are initially aired. Existing methods of analyzing television content viewership typically rely solely on recording viewership of programs as they are aired, and therefore viewers who view recorded programs may not be included in the viewership statistics. In addition, existing methods of analyzing television content viewership may be too coarse for accurate analysis. For example, some methods may consider a viewer to have viewed an entire advertisement if they view only one second of the advertisement. As a result, advertisers and other groups may not have an accurate picture of the number and demographics of viewers of television content.

To address these and other problems associated with existing systems, embodiments of the disclosure provide system and methods for determining television consumption behavior. In some embodiments, a small electronic device with multiple sensors (referred to herein as a "TV meter") is installed in a room where the primary television for a household resides (e.g., living room, den, kitchen, etc.). The primary television may be, for example, the television on which a majority of the household's programming is watched. Subject to the users' approval, the TV meter may be placed in a position to have an unobstructed view of the audience, such as next to the television, in order to collect data on the viewing behavior of users. The data collected by the TV meter may include an identification of the audience, the content being watched, and the amount of attention the audience pays to the television content. Certain collected data may then be utilized by, for example, a social-networking system to provide various insights and products to, for example, third parties associated with the television content (e.g., advertisers, producers, etc.). As a result, third parties such as advertisers may be able to target the most desirable shows in which to advertise for their product.

Figure 1:
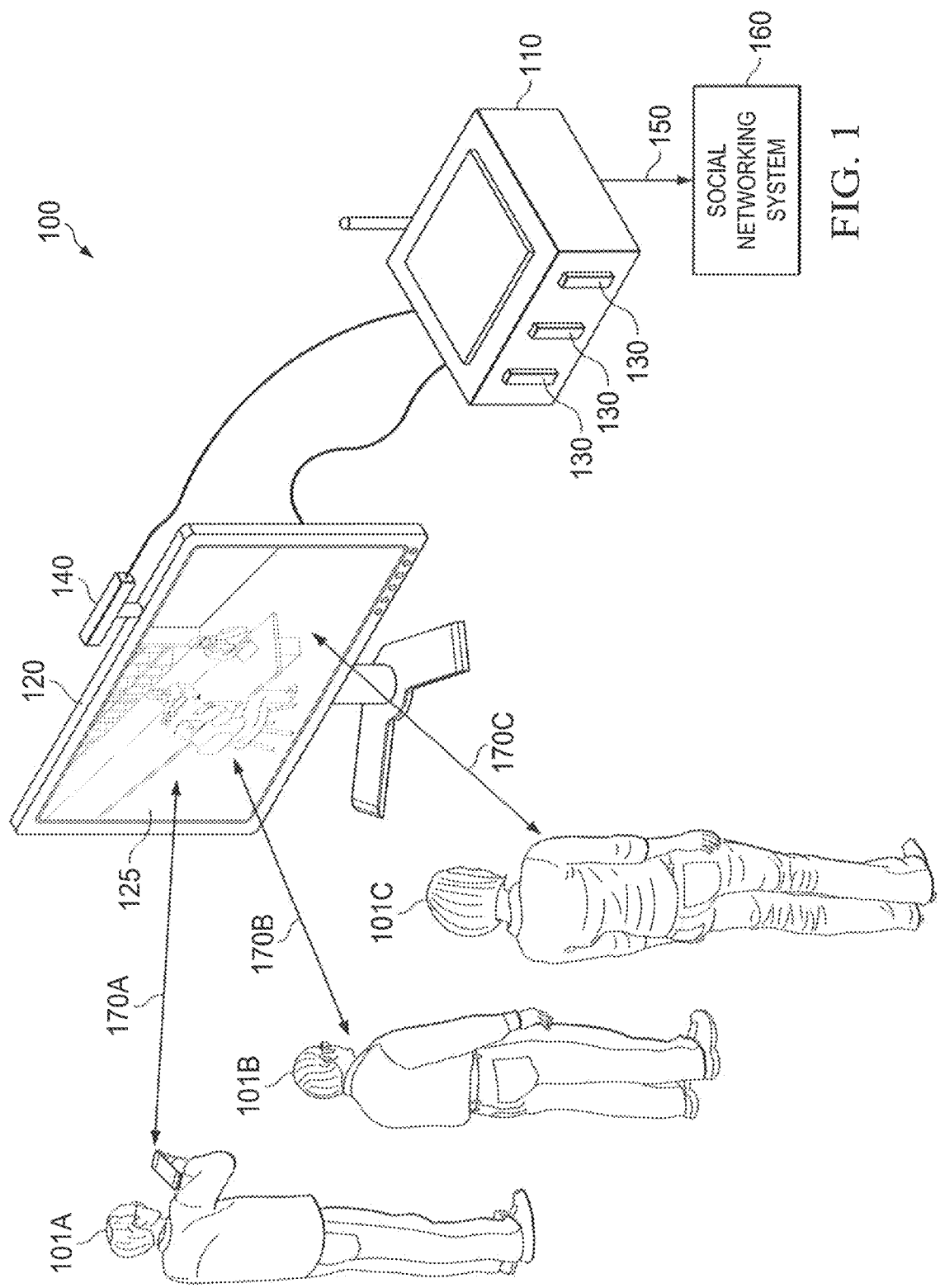
FIG. 1 illustrates a system that includes a TV meter for determining television consumption behavior.

FIG. 1 illustrates a system 100 for determining television consumption behavior. In some embodiments, system 100 includes a TV meter 110 that may be coupled to a television 120 and a social-networking system 160. TV meter 110 includes one or more sensors 130 and may utilize one or more external sensors such as a camera 140.

In general, TV meter 110 is utilized to observe one or more users 101 who are watching content 125 on television 120. When television 120 is on, TV meter 110 utilizes one or more sensors 130 to detect what content 125 is being watched on television 120, which users 101 are watching television 120, and the amount of attention being paid by users 101 to television 120. For example, TV meter 110 may utilize one or more sensors 130 to determine distances 170 between users 101 and television 120. If a particular user 101 is within a certain distance 170 of television 120 while it is on, TV meter 110 may infer that the particular user 101 is paying attention to television 120. In some embodiments, TV meter 110 may utilize other data in addition to or instead of distances 170 to determine whether particular users 101 are paying attention to television 120. For example, some embodiments of TV meter 110 may determine whether the eyes of a particular user 101 are open. TV meter 110 may then utilize these or other facial features of users 101 to then determine whether users 101 is paying attention to content on television 120. TV meter 110 may then transmit, subject to user privacy settings, certain captured data 150 to another system such as social-networking system 160. Captured data 150 may be collected and aggregated from multiple TV meters 110 in order to provide various products and insights to various third parties about the television consumption behavior of users 101, as described in more detail below.

Television 120 is any display device utilized by users 101 to watch content 125. Television 120 may be a typical TV, or may be a display device such as a computer display. In some embodiments, television 120 is the primary television in which a majority of the household's programming is watched. In other embodiments, television 120 is not the primary television in which a majority of the household's programming is watched.

Content 125 is any program viewable on any appropriate display device such as television 120. In some embodiments, content 125 is a show, movie, event (e.g., sporting event, and the like. In some embodiments, content 125 is an advertisement.

Sensors 130 are any appropriate sensors utilized by TV meter 110 to capture data about the environment in which television 120 is located. In some embodiments, sensors 130 include one or more microphones (e.g., a microphone array), one or more cameras (e.g., infrared (IR), visible-light cameras, etc.), one or more motion detectors, one or more light detectors, and the like. In some embodiments, certain sensors 130 are located on TV meter 110 in such as way as to easily observe users 101. For example, a camera and motion sensor 110 may be positioned on a side of TV meter 110 that can be easily pointed towards users 101. While certain embodiments are described as having a certain arrangement and number of sensors 130, TV meter 110 may have any appropriate arrangement and number of sensors 130.

Camera 140 is any external camera to TV meter 110. In some embodiments, camera 140 is communicatively coupled to TV meter 110 via a wired connection such as via a USB cable. In other embodiments, camera 140 is communicatively coupled to TV meter 110 via a wireless connection or via a network. In some embodiments, camera 140 is positioned on top of or around television 120 so as to more accurately capture images of users 101 watching television 120.

Captured data 150 is any data captured or generated by TV meter 110 by observing the environment around television 120. Captured data 150 may include, for example, attention levels of users 101 and audio fingerprints, as described in more detail below. In some embodiments, only certain captured data 150 is transmitted off of TV meter 110 for privacy concerns. For example, TV meter 110 may be limited to only transmitting captured data 150 that is anonymous (e.g., does not include any personal information or identification of users 101).

Social-networking system 160 is any network-addressable computing system that can host an online social network. In some embodiments, social-networking system 160 may refer to any computing system (e.g., a server) within the social-networking system 160. In some embodiments, social-networking system 160 is social-networking system 960 described in more detail below in reference to FIG. 9.

Distances 170 (e.g., 170A-C) are lengths between television 120 and users 101. For example, distance 170A indicates how far user 101A is away from television 120, distance 170B indicates how far user 101B is away from television 120, and distance 170C indicates how far user 101C is away from television 120. Distances 170 may be measured from any portion of user 101 to any portion of television 120. For example, in some embodiments, distances 170 indicate how far a face of a particular user 101 is from a display screen of television 120. Distances 170 may be calculated or estimated by TV meter 110 using any appropriate method or sensors 130. For example, some embodiments of TV meter 110 may utilize sound triangulation from a microphone array to determine how far a particular user 101 is from television 120. As another example, some embodiments of TV meter 110 may analyze one or more images from a camera 130 or camera 140 to determine how far a particular user 101 is from television 120. In some embodiments, TV meter 110 compares a calculated distance 170 for a particular user 101 to a predetermined distance in order to determine whether the particular user 101 could be paying attention to television 120. For example, if distance 170A is less than or equal to the predetermined distance (e.g., five feet, ten feet, etc.), then TV meter 110 may consider user 101A as paying attention to television 120. Observations in addition to or instead of distances 170 may also be factored into whether users 101 are paying attention to television 120, as described in more detail below.

Figure 2:
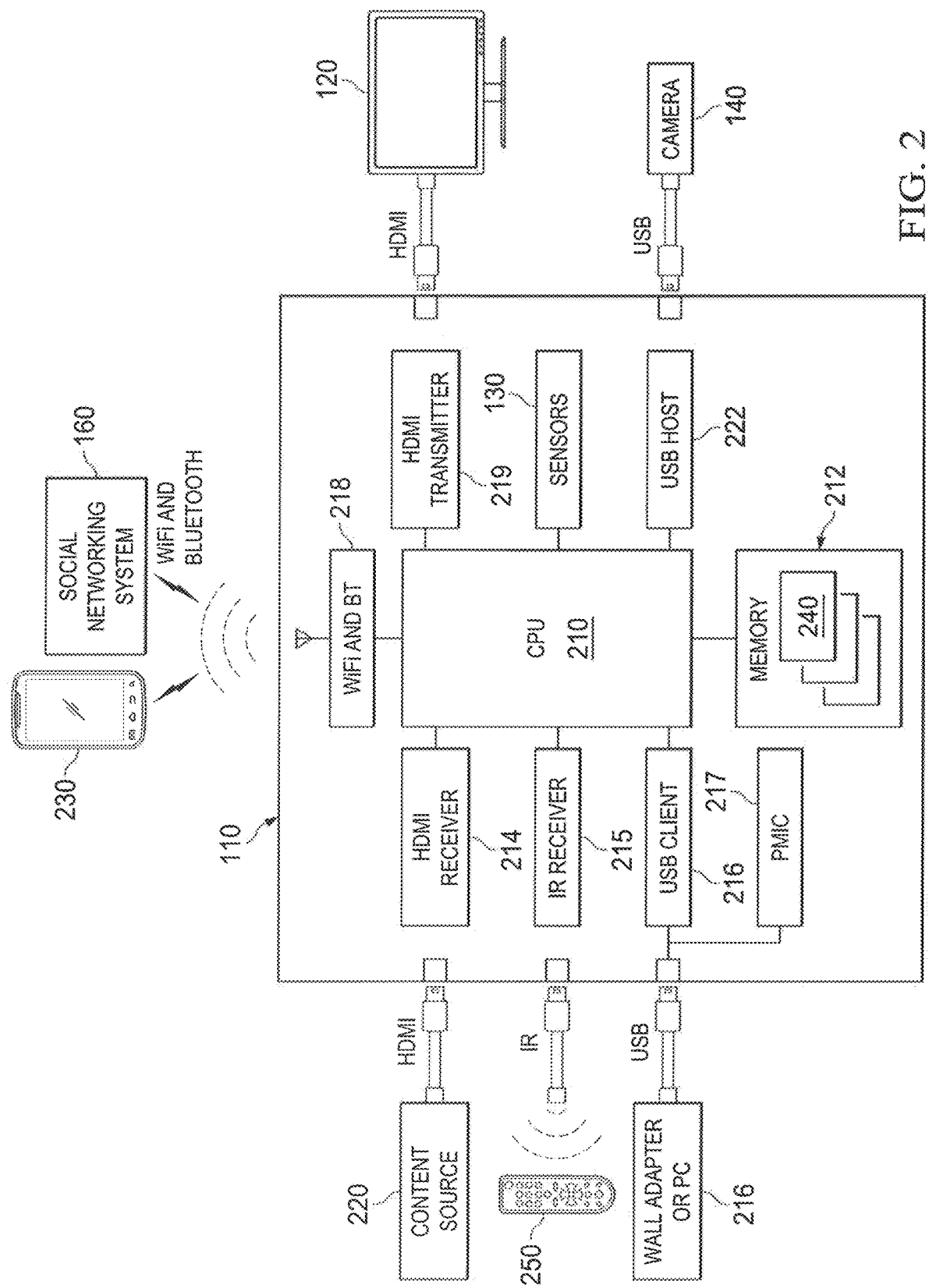
FIG. 2 illustrates an example embodiment of the TV meter of FIG. 1.

FIG. 2 illustrates an example embodiment of TV meter 110 of FIG. 1. In this embodiment, TV meter 110 includes a CPU 210, memory 212, HDMI receiver 214, IR receiver 215, USB client 216, power management IC (PMIC) 217, WiFi/BLUETOOTH transceiver 218, HDMI transmitter 219, and USB host 222. HDMI receiver 214 receives a video stream from a content source 220 (e.g., a cable box, a satellite receiver, etc.) via an HDMI cable. IR receiver 215 receives IR communications from a remote control device 250. USB client 216 communicates with any device such as camera 140 or a PC via USB. PMIC 217 provides power to TV meter 110 via a USB cable plugged into a wall adapter or PC 260. WiFi/BLUETOOTH transceiver 218 communicates with mobile device 230 and social networking system 160 using WiFi and/or BLUETOOTH (either directly or via a network). In some embodiments, BLUETOOTH transceiver 218 is standard BLUETOOTH or BLUETOOTH low energy (BTLE). HDMI transmitter 219 communicates a video stream to television 120 via an HDMI cable. USB host 222 provides USB communications to devices such as camera 140. Devices 214-222 are communicatively coupled to CPU 210 via, for example, a bus. CPU 210 controls the operation of TV meter 110 and performs one or more of the functions of TV meter 110 described herein. While a particular embodiment of social TV meter 110 is illustrated in FIG. 2, TV meter 110 may include any appropriate components in any appropriate configuration. For example, TV meter 110 may include components to receive data from television 120 via any appropriate cable or wire (e.g., a composite cable input, a USB cable, an HDMI cable, etc.). In certain embodiments, TV meter 110 may be fully or partially implemented in SW. In some embodiments, TV meter 110 may be a low-cost implementation that includes a minimal amount of memory or processing power. In some embodiments, TV meter 110 may include or be a computer system 1100 as described in reference to FIG. 11.

In some embodiments, TV meter 110 may be configured (e.g., during an initial or installation process, etc.) or controlled by an appropriate means. In some embodiments, TV meter 110 includes a touch-enabled display screen that permits user 101 to view and select options for TV meter 110 (e.g., privacy settings, etc.). In some embodiments, a keyboard and/or a mouse (or any other user-input device) may be connected to TV meter 110 via, for example, USB, that permits user 101 to select options and control TV meter 110. In some embodiments, an application running on mobile device 230 may permit user 101 to select options and control TV meter 110.

In some embodiments, TV meter 110 operates when television 120 is turned on. For example, TV meter 110 may detect signals on an HDMI cable, a composite cable input, a USB cable, or any other appropriate link from television 120 in order to determine if television 120 is turned on. In some embodiments, camera 140 may utilize one or more microphones 130 to detect sounds from television 120 and therefore determine that television 120 is turned on. In some embodiments, users 101 can control when TV meter 110 operates. For example, a user-selectable option (e.g., a button, switch, etc.) may be provided on TV meter 110 or in a mobile application on mobile device 230 that allows user 101 to power down or pause TV meter 110 from collecting data if they desire privacy. This may permit user 101 to temporarily prevent TV meter 110 from, for example, capturing sounds or images from the environment around television 120. In some circumstances, user 101 may be monetarily compensated for allowing TV meter 110 to analyze their television viewing behaviors. In such cases, a certain allotment of down time per day (e.g., TV meter 110 being powered down or paused) may be permitted before the compensation for allowing TV meter 110 to collect data begins decreasing. In some embodiments, compensation may be increased to proactively discourage downtime. For example, an increase in monetary compensation may be offered to keep TV meter 110 active during all TV watching during a particular event (e.g., Super Bowl Sunday).

In some embodiments, TV meter 101 will not collect data or process any data when television 120 is turned off. For example, as described above, TV meter 110 may detect signals on an HDMI cable from television 120 or may utilize one or more microphones 130 to detect sounds from television 120 and therefore determine whether television 120 is turned on or off. If TV meter 110 determines that television 120 is turned off, some embodiments of TV meter 110 cease collecting data (e.g., photos, sounds, etc.) from sensors 130. In some embodiments, TV meter 110 may also power itself down (e.g., to a low-power state) if TV meter 110 determines that television 120 is turned off.

As mentioned above, TV meter 110 is typically installed at a location in a household in order to observe the environment around the primary television 120 of the household. In some embodiments, additional TV meters 110 may be provided for monitoring non-primary televisions 120 (e.g., in bedrooms, etc.). In such embodiments, the TV meters 110 provided for non-primary televisions 120 may be the same as those used for the primary television 120, but may be smaller or less-powerful devices in other cases. For example, versions of TV meter 110 for non-primary television 120 may include less sensors 130, less processing power, less memory, etc. In some embodiments, all TV meters 110 in a single residence (e.g., those installed at the same physical address) may communicate with social-networking system 160 via a single TV meter 110 at the residence. For example, all non-primary TV meters 110 at an address may communicate their captured data 150 to the primary TV meter 110 at the address, and the primary TV meter 110 may then consolidate and communicate all captured data 150 from all TV meters 110 at that address to social-networking system 160. In other embodiments, each TV meter 110 at a single address may communicate independently with social-networking system 160.

In some embodiments, TV meter 110 may be capable of sending push notifications to users 101. For example, TV meter 110 may send a notification to user 101 that asks, "are you the one watching this TV?" This may enable TV meter 110 to more accurately identify exactly who is watching television 120. As another example, TV meter 110 may send a notification to user 101 that asks a survey question such as "would you consider buying the car in this advertisement?" The answer by user 101 may be sent via captured data 150 to social-networking system 160 where it may be provided, for example, to the advertiser. In some embodiments, notifications are sent directly to user 101 (e.g., via mobile device 230). In other embodiments, notification are sent to user 101 via social-networking system 160 in response to instructions from TV meter 110.

In some embodiments, TV meter 110 performs three main tasks during operation: 1) determining which content 125 users 101 are watching, 2) determining which users 101 are watching content 125, and 3) determining how much attention users 101 are paying to content 125. Each of these tasks are discussed in more detail below.

First, TV meter 110 may determine which content 125 users 101 are watching on television 120. In one embodiment, TV meter 110 utilizes one or more microphones 130 to captures sounds from the environment around television 120. The captured sounds may then be used to generate audio fingerprints of the captured sounds. The audio fingerprints may be transmitted to social-networking system 160 within captured data 150 where they may be compared to audio fingerprints of known television programs and advertisements. In other embodiments, the audio fingerprints may be directly processed by TV meter 110 (i.e., compared to audio fingerprints of known television programs and advertisements). If a match is found to a known television program and advertisements, TV meter 110 may determine that user 101 was watching the television program or advertisements of the matched audio fingerprint.

In some embodiments, TV meter 110 may have difficulty identifying content 125 using microphones 130 if user 101 has muted television 120. To overcome this limitation, certain embodiments of TV meter 110 may analyze signals on an HDMI cable, a composite cable input, a USB cable, or any other appropriate link from television 120 to determine which content 125 users 101 are watching on television 120. Since HDMI typically sends audio data regardless of whether television 120 is muted, TV meter 110 may capture the sound data from the HDMI cable and compare it to audio fingerprints of known television programs and advertisements. In some embodiments, devices such as an HDMI composite pass-through or a composite splitter plus an audio extractor may be used to capture audio data from the HDMI cable from television 120. In such embodiments, a 3.5 mm audio cable could feed the audio to TV meter 110 where it is captured and analyzed.

In some embodiments, video fingerprinting may be utilized to determine which content 125 users 101 are watching on television 120. For example, a camera 130 or camera 140 may be utilized to capture one or more images or video of content 125 as it is being displayed on television 120. The captured images or video may then be compared by TV meter 110 or social-networking system 160 to video fingerprints of known television shows and commercials.

As mentioned above, some embodiments of TV meter 110 perform audio fingerprinting in order to determine what content 125 users 101 are watching. The audio fingerprints may be sent from TV meter 110 to another computer system in order to avoid sending ordinary audio off of the device. This may increase the privacy and security of TV meter 110, and may provide more assurance to users 101 that their information remains private. Any appropriate fingerprinting technique may be utilized by TV meter 110. In some embodiments, TV meter 110 generates audio fingerprints at predetermined intervals or increments (e.g., every one second, two seconds, etc.). In some embodiments, the audio fingerprint files are 128 bytes for each second of audio content, but may be adjusted for desired audio quality.

Second, TV meter 110 may determine which users 101 are watching television 120. In some embodiments, TV meter 110 may determine which users 101 are watching content 125 by performing Wi-Fi scanning. For example, TV meter 110 may obtain identifications from Wi-Fi such as MAC or IP addresses. The obtained identifications may then be compared, for example, by social-networking system 160 to stored identifications for users of the social-networking system (e.g., from user profiles or a social graph) in order to determine an identify of user 101.

In some embodiments, TV meter 110 may utilize BLUETOOTH to determine which users 101 are watching television 120. Similar to Wi-Fi, TV meter 110 may obtain identifications from BLUETOOTH such as MAC or IP addresses. The obtained identifications may then be compared, for example, by social-networking system 160 to stored identifications for users of the social-networking system (e.g., from user profiles or a social graph) in order to determine an identify of user 101. In some embodiments, TV meter 110 may utilize BLUETOOTH to triangulate locations of users 101 and distances 170.

In some embodiments, TV meter 110 may utilize face detection to determine which users 101 are watching television 120. For example, TV meter 110 may analyze (or send to social-networking system 160 for analysis) one or more images or videos captured by one or more cameras 130 or camera 140. In some embodiments, the captured images or video may be compared to images or videos associated with user accounts at social-networking system 160 in order to determine identities of users 101. For example, if a face in an image captured by TV meter 110 matches one or more faces in images associated with a particular user of social-networking system 160 (e.g., profile images, cover images, etc.), TV meter 110 or social-networking system 160 may determine that user 101 is the particular user of social-networking system 160. In some embodiments, user 101 may then be linked with an identification for the particular user at social-networking system 160.

In some embodiments, TV meter 110 may utilize Universal Plug and Play (UPnP) to determine which users 101 are watching television 120. For example, TV meter 110 may discover other user devices that are connected to the same network as TV meter 110 using UPnP. TV meter 110 may then may obtain identifications from UPnP for the user devices. The obtained identifications may then be compared, for example, by social-networking system 160 to stored identifications for users of the social-networking system (e.g., from user profiles or a social graph) in order to determine an identify of user 101.

In some embodiments, TV meter 110 may log any determined identifications associated with users 101 in profiles 240 that are stored in memory 210. For example, if TV meter 110 determines that user 101A is watching television 120 by utilizing face recognition as described above, TV meter 110 may generate and store a profile 240 for user 101A in memory 212 and may include any determined identification for user 101A in the profile 240. In some embodiments, as described in more detail below in reference to FIG. 4, profiles 240 may also store attention models for their associated user 101.

In some embodiments, TV meter 110 may determine demographic information for users 101. For example, TV meter 110 may determine a probable race, gender, age, etc. of users 101 using one or more sensors 130. As one example, one or more images captured by camera 130 or camera 140 may be compared by TV meter 110 (or social-networking system 160) to images of people with known demographics. For example, if a face of user 101A in an image captured by TV meter 110 matches (or is comparable to a certain degree) to a face in an image of a known female of a particular race and age, TV meter 110 or social-networking system 160 may determine that user 101 is also a female of the particular race and age. In some embodiments, if user 101A is associated with an account at social-networking system 160, demographics of user 101A may be obtained from a user profile of the user at social-networking system 160.

In some embodiments, TV meter 110 may determine whether one or more eyes of users 101 are open. For example, TV meter 110 may determine whether one or more eyes of users 101 are open using one or more sensors 130. As one example, one or more images captured by camera 130 or camera 140 of faces of users 101 may be analyzed by imaging software that identifies facial features such as eyes. As another example, one or more images captured by camera 130 or camera 140 of faces of users 101 may be compared by TV meter 110 (or social-networking system 160) to images of people with known eye states. For example, if a face of user 101A in an image captured by TV meter 110 matches (or is comparable to a certain degree) to a face in an image of a person known to have open eyes, TV meter 110 or social-networking system 160 may determine that eyes of user 101 are also open.

In some embodiments, TV meter 110 may determine an inferred emotional state of users 101. For example, TV meter 110 may determine a probable emotion state (e.g., happy, sad, etc.) of users 101 using one or more sensors 130. As one example, one or more images captured by camera 130 or camera 140 of faces of users 101 may be compared by TV meter 110 (or social-networking system 160) to images of people with known emotional states. For example, if a face of user 101A in an image captured by TV meter 110 matches (or is comparable to a certain degree) to a face in an image of a person known to be happy (e.g., is smiling, etc.), TV meter 110 or social-networking system 160 may determine that user 101 is also happy.

Third, TV meter 110 may determine how much attention users 101 are paying to content 125. In some embodiments, attention levels determined for users 101 are binary: either TRUE (paying attention) or FALSE (not paying attention). In some embodiments, attention levels for users 101 are not binary and may be represented on any appropriate scale or number system (e.g., from 1-100, etc.). In some embodiments, Boolean logic may be utilized to determine if user 101 is or is not paying attention to television 120. For example, a particular user 101 may be considered to be paying attention to television 120 if their eyes are open while television 120 is on and they are within a certain distance of television 120. Specific examples of utilizing Boolean logic to determine whether or not user 101 is paying attention to television 120 are discussed in detail below in reference to FIG. 3. In some embodiments, a current attention level of a particular user 101 may be compared to a profile 240 for the particular user 101 stored in memory 212 of TV meter 110. The profile may indicate an average or typical attention level for the particular user (e.g., the particular user typically looks at television 120 for at least 70% of the time they are within a certain distance 170 of television 120 while it is on). By comparing the current attention level of a particular user 101 to a typical attention level for the particular user 101 in their stored profile 240, TV meter 110 may be able to indicate heightened or decreased attention levels for the particular user 101 (e.g., user 101A paid more attention to this particular show than normal).

In some embodiments, environmental factors are used by TV meter 110 to determine attention levels to content 125 by users 101. For example, TV meter 110 may analyze sounds captured by one or more microphones 130 to determine whether users 101 are paying attention to content 125. As a specific example, if TV meter 110 determines from captured sounds that user 101 is talking during a commercial 125 (e.g., if two users 101 are talking to each other or if a user 101 is talking to a device), TV meter 110 may determine that users 101 were not paying attention to the commercial 125. As another example, if TV meter 110 determines from captured sounds that a mobile device 230 of user 101 is playing a video during a commercial 125, TV meter 110 may determine that user 101 was not paying attention to the commercial 125. On the other hand, if TV meter 110 determines from captured sounds that user 101 was silent during a commercial 125, TV meter 110 may determine that user 101 was paying attention to the commercial 125.

In some embodiments, TV meter 110 performs head pose recovery and/or body pose recovery in order to determine where user 101 is looking. If user 101 is determined to be looking towards television 120, TV meter 110 may determine that user 101 is paying attention to television 120. In some embodiments, TV meter 110 analyzes one or more images of user 101 captured by sensors 130 or camera 140 in order to performs head pose recovery and/or body pose recovery. For example, TV meter 110 may analyze an image of the face of user 101 captured by camera 140 that is located on or around television 120. If the eyes of user 101 in the captured image are generally pointed towards camera 140, TV meter 110 may determine that user 101 is looking towards camera 140 (and thus towards television 120) and conclude that user 101 is paying attention to television 120. In some embodiments, TV meter 110 may determine from a captured image a direction in which eyes of user 101 are focused. If the direction is towards television 120, TV meter 110 may conclude that user 101 is paying attention to television 120. If the direction is towards another device or object (e.g., user 101A looking at mobile device 230), TV meter 110 may conclude that user 101 is not paying attention to television 120. Similarly, TV meter 110 may analyze an image of user 101 captured by camera 140 that is located on or around television 120 to determine a body pose of user 101. If user 101's body is determined to be towards television 120, TV meter 110 may conclude that user 101 is paying attention to television 120. If the direction of user 101's body is away from television 120 or towards another device or object (e.g., towards another person), TV meter 110 may conclude that user 101 is not paying attention to television 120.

In some embodiments, TV meter 110 may analyze a volume of television 120 in order to determine whether user 101 is paying attention to television 120. For example, TV meter 110 may analyze sounds captured by microphones 130 in order to determine that television 120 is muted. Or, TV meter 110 may analyze signals on an HDMI cable from television 120 to determine that television 120 is muted. If TV meter 110 determines that television 120 is muted, TV meter 110 may determine that users 101 are not paying attention to content 125 on television 120.

In some embodiments, TV meter 110 may analyze network traffic or bandwidth usage in order to determine whether user 101 is paying attention to television 120. For example, if traffic across a wireless router increases during a commercial 125, TV meter 110 may conclude that user 101 is not paying attention to commercial 125. On the other hand, if network traffic or bandwidth suddenly decreases during a commercial 125, TV meter 110 may conclude that user 101 is paying attention to commercial 125.

In some embodiments, TV meter 110 may analyze mobile application usage in order to determine whether user 101 is paying attention to television 120. For example, if usage of the mobile application (e.g., a mobile application of social-networking system 160 running on mobile device 230) increases during a commercial 125, TV meter 110 may conclude that user 101 is not paying attention to commercial 125. On the other hand, if usage of the mobile application suddenly decreases during a commercial 125, TV meter 110 may conclude that user 101 is paying attention to commercial 125.

Some embodiments may analyze dwell times of user 101 in order to determine whether user 101 is paying attention to television 120. For example, TV meter 110 may analyze images captured from one or more cameras (e.g., sensors 130 or camera 140) in order to determine a head pose of user 101 as described above. If the determined head pose of user 101 stays constantly towards television 120 for a period of time (e.g., across multiple sequential captured images), TV meter 110 may conclude that user 101 is paying attention to television 120. On the other hand, if the determined head pose of user 101 is towards television 120 for only a certain percentage of time (e.g., for only 20% of a one-minute period of time), TV meter 110 may conclude that user 101 is not paying attention to television 120.

In some embodiments, facial features of user 101 are used to determine whether user 101 is paying attention to television 120. For example, one or more eyes of user 101 may be analyzed to determine if user 101 is paying attention to television 120. As a specific example, if at least one eye of user 101 is open for a certain percentage of time, TV meter 110 may conclude that user 101 is paying attention to television 120. On the other hand, if one or both eyes of user 101 are closed for a certain percentage of time (or for a certain consecutive period/length of time) TV meter 110 may conclude that user 101 is sleeping and not paying attention to television 120. Other facial features may include mouth, check, and eyebrow positions of user 101. For example, if it is determined that user 101 is making a surprised or startled expression with their eyebrows and mouth, TV meter 110 may conclude that user 101 is paying attention to television 120.

FIG. 3 illustrates an example method 300 that may be utilized by TV meter 110 to determine attention levels of users 101. In general, method 300 utilizes Boolean logic to determine whether a particular user 101 is paying attention to television 120. While specific Boolean logic is utilized by method 300, other methods may utilize any other appropriate Boolean logic and may include more or fewer steps than those illustrated with respect to method 300.

Method 300 may begin in step 310 where it is determined whether or not a television is powered on. In some embodiments, the television is television 120. In some embodiments, step 310 may include detecting signals on an HDMI cable from the television in order to determine if the television is turned on. In some embodiments, step 310 may utilize one or more microphones to detect sounds from the television and therefore determine that the television is turned on. In some embodiments, step 310 may include monitoring power consumption of the television to determine whether the television is powered on.

At step 320, method 300 determines, using at least one sensor such as sensor 130, that a particular user is within a predetermined distance of the television. For example, step 320 may utilize sound triangulation from a microphone array to determine how far the particular user is from the television (e.g., distance 170). As another example, step 320 may analyze one or more images from a camera to determine how far the particular user is from the television. Once the distance between the user and the television is determined, step 320 may compare it to a predetermined distance. For example, step 320 may determine if the distance is less than or equal to a predetermined maximum distance. The predetermined distance can, for example, be user-specific, home-specific, etc., and could change over time as furniture is moved (e.g., for an event or a room change) or the environment around television 120 changes. In some embodiments, the predetermined distance may be re-assessed at any interval (e.g., every minute, hour, day, etc.) or if any sensor 130 detects a sufficient change in the environment around television 120.

At step 330, method 300 determines, using at least one sensor, a facial feature of the particular user. The facial feature may include eye status (e.g., open or closed), head pose, mouth position, and eyebrow positions. In some embodiments, the sensor is a camera, and step 330 includes determining, using the camera, whether one or more eyes of the particular user are open for a predetermined amount of time. For example, step 330 may include analyzing multiple photos taken sequentially within a certain amount of time to determine if one or more eyes of the particular user are open for a certain amount or percentage of time. In some embodiments, the sensor is a camera, and step 330 includes determining, using the camera, whether a head pose or eye focus of the particular user is towards the television.

At step 340, method 300 determines that the particular user is paying attention to the television based at least in part on the determinations of steps 310-330. More specifically, step 340 determines that the particular user is paying attention to the television based on the determination that the television is powered on, the determination that the particular user is within the certain distance of the television, and the determined facial feature of the particular user. As a specific example, if it is determined that the television is on, the particular user is within a certain distance of the television, and at least one eye of the user is open for at least a certain amount of time, it may be determined that the particular user is paying attention to the television. After step 340, method 300 may end.

While particular embodiments of method 300 have been described as requiring three criteria to be met (namely, a determination that the television is powered on, a determination that the particular user is within the certain distance of the television, and a determined facial feature of the particular user), other embodiments may require more or fewer of these or other criteria for determining whether a user is paying attention to a television. For example, some embodiments may determine that a user is paying attention to a television if the television is on and their eyes are open. As another example, some embodiments may determine that a user is paying attention to a television if the television is on and they are within a certain distance of the television. Conversely, some embodiments may determine that a user is not paying attention to a television if one or more of these conditions are not me, or if any other condition is detected (e.g., a user is talking or is looking at something other than television 120).

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for determining attention levels of users including the particular steps of the method of FIG. 3, this disclosure contemplates any suitable method for determining attention levels of users including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIG. 4 illustrates an example method 400 of how TV meter 110 may use locally-stored attention models to determine attention levels of users. In general, method 400 utilizes locally-stored attention models to determine whether a particular user 101 is paying more or less attention to television 120 than normal for them. For example, a current attention level of a particular user to a commercial may be compared to the particular user's normal attention level. As a result, it may be determined whether or not the particular user is paying more or less attention to the commercial than they normally would.

Method 400 may begin in step 410 where a TV meter determines an identity of a particular user watching a television. The identity of the particular user may be determined using facial recognition/detection, Wi-Fi scanning, BLUETOOTH, UPnP, or any other appropriate method, including any method described in reference to system 100 above. In some embodiments, step 410 may include cross-referencing any obtained identification for the particular user (e.g., MAC address, IP address, user ID, etc.) with user profiles of a social-networking system in order to determine the identity of the particular user watching the television. In some embodiments, once an identification for the particular user is obtained, it may be stored locally in memory of the TV meter. In some embodiments, the identification may be stored in a profile for the particular user such as profile 240.

In step 420, the TV meter accesses, based on the determined identity of step 410, an attention model for the particular user that is stored in memory of the TV meter. In some embodiments, the attention model includes a baseline attention level for the particular user, as described in more detail below. In some embodiments, the attention model is stored in the profile of step 410, but may be separately stored in memory of the TV meter in other embodiments.

In general, attention models may be used in some embodiments to more accurately determine a relative amount of attention being paid by a particular user to content being watched on a television. In some embodiments, a baseline attention level for a particular user is determined and then stored in the particular user's attention model. In some embodiments, the baseline attention level indicates average or typical quantitative observations for the user such as: an amount of time the particular user is typically within a predetermined distance of the television while the television is powered on; an amount of time the particular user looks towards the television while the particular user is within the predetermined distance of the television while the television is powered on; an amount of time one or more eyes of the particular user are open while the particular user is within the predetermined distance of the television while the television is powered on; and an amount of time the particular user is not talking while the particular user is within the predetermined distance of the television while the television is powered on. These and other observations for the particular user may be obtained by the TV meter and then stored in the user's attention profile. The attention profile may be updated over time as more observations are made by the TV meter. For example, the TV meter may average a particular observation over time for a particular user and update the user's attention profile accordingly. As a specific example, the TV meter may initially observe that the particular user looked towards the television for 70% of the time that a particular show was playing on the television. The TV meter may record this observation in the particular user's attention profile on the TV meter. At a subsequent time, the TV meter may observe that the particular user looked towards the television for 80% of the time that a particular show was playing on the television. The TV meter may update the particular user's attention profile on the TV meter with this new data by, for example averaging the two observed times. In this case, the average of the two observed times would be 75%, which indicates a typical/average amount of time the particular user looks toward the television during a show. The data in the attention profile may then be used to determine whether the particular user is paying more or less attention than is typical, as described in more detail below. In some embodiments, when updating an attention model, a push notification may be used to trigger feedback from the user after watching a show. For example, the user may be provided with a notification such as "On a scale of 1-5 with 5 indicating complete attention and 1 indicating complete inattention, how would you rate your attention to the episode of Game of Thrones that you just watched?" As another example, the notification may include simple visualizations of attention that the user could select (e.g., emojis like eyes wide, neutral, sleeping, etc.) The user's response may then be used to calibrate any produced estimates of attention.

In some embodiments, multiple attention models may be stored locally in a particular TV meter. For example, if the TV meter has in the past detected two different users 101 (e.g., user 101A and user 101B) watching the television, the TV meter may create an attention model for each detected user: a first attention model for user 101A and a second attention model for user 101B. Each attention model may have an associated user identification. For example, if user 101A is determined to have a user ID on social-networking system 160 of "USER101A," the first attention model may store or otherwise be associated with user ID "USER101A." When accessing the stored attention models for a particular user, the TV meter may attempt to match the determined identity of the particular user with the user identifications of the stored attention models. For example, if the TV meter determines that user 101A is currently watching the television, the TV meter may determine that the user ID of user 101A is "USER101A" and then look up which stored attention model is associated with "USER101A."

In step 430, the TV meter determines, using one or more sensors such as sensors 130, a current amount of attention paid by the particular user to the television. In some embodiments, the amount of attention is based on one or more of: a determined facial feature of the particular user; a determination that the television is powered on; and a determination that the particular user is within a predetermined distance of the television. The facial features may include, for example, eye status (e.g., open or closed), head pose, mouth positions, and eyebrow positions, as described above. In some embodiments, any other appropriate method disclosed herein, including any method described in reference to system 100 above, may be utilized by step 430 to determine a current amount of attention paid by the particular user to the television. Using the specific example discussed in step 420, this step may include determining that the particular user looked towards the television for 50% of the time that a particular commercial was playing on the television.

In step 440, the TV meter compares the baseline attention level of step 420 for the particular user with the current amount of attention determined in step 430 in order to provide a comparison attention level for the particular user. Continuing the specific examples discussed above in steps 420 and 430, step 420 may include comparing the baseline attention level of 75% (the typical/average amount of time the particular user looks toward the television) with the current attention amount of 50% (the amount of time the particular user looked towards the television while a particular commercial was playing on the television) and therefore determine a comparison attention level of negative 25% (i.e., a decrease in the amount of typical attention by 25%). Once the attention levels are compared in step 440, the comparison may be: provided to a third party (e.g., an advertiser, show producer, etc.); aggregated with comparison data for the particular content from other users (i.e., collected by other TV meter devices); and/or displayed on any appropriate display device. In some embodiments, the raw comparison attention levels may be used (e.g., negative 25%), but a simple comparison of "increase" or "decrease" may be provided in other embodiments (e.g., the particular user paid less attention to the commercial than they typically pay to content on the television).

Some embodiments of method 400 may additionally include determining a specific program or advertisement that the particular user is currently watching on the television. In some embodiments, this step may include utilizing audio fingerprints, as described in reference to system 100. Other embodiments, however, may include any other appropriate method described herein. In some embodiments, method 400 may additionally provide for display on a display device the comparison attention level for the particular user for the specific program or advertisement. Using the above examples, method 400 may determine that the particular user was watching a commercial for a specific car brand. Method 400 may therefore display that the particular user paid 25% less attention to a commercial for the specific car brand than they typically pay.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for using locally-stored attention models to determine attention levels of users including the particular steps of the method of FIG. 4, this disclosure contemplates any suitable method for using locally-stored attention models to determine attention levels of users including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
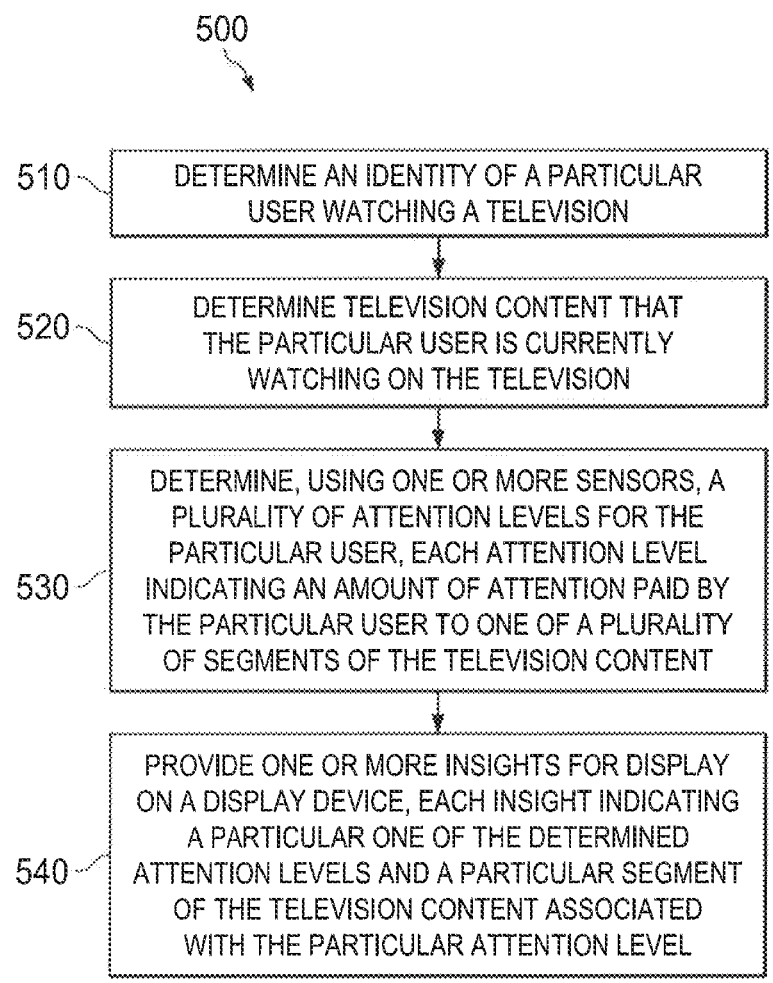
FIG. 5 illustrates an example method that may be utilized by the system of FIG. 1 to provide insights based on determined attention levels of users.

FIG. 5 illustrates an example method 500 for providing insights based on determined attention levels of users. In general, the insights provided by method 500 may identify specific portions of television content that resonates with people. For example, machine learning may be used in certain embodiments to identify and tag thematic elements in a video (e.g. animals, people speaking a certain language, landmarks, color palettes, etc.) along with timestamps where they are present in the video. The TV meter may use the methods of determining users' attention as described herein to provide a second-by-second analysis of which users paid attention to the video (and perhaps how much attention they paid). The determined attention levels may be correlated with the timestamps of the tagged thematic elements in order to determine which thematic elements resonated best or least with the users. As a result, content providers and advertisers may have a better picture of what to include or exclude from their content in the future.

Method 500 may begin at step 510 where the TV meter determines an identity of a particular user watching the television. The identity of the particular user may be determined using facial recognition/detection, Wi-Fi scanning, BLUETOOTH, UPnP, or any other appropriate method, including any method described in reference to system 100 above. In some embodiments, step 510 may include cross-referencing any obtained identification for the particular user (e.g., MAC address, IP address, user ID, etc.) with user profiles of a social-networking system in order to determine the identity of the particular user watching the television. In some embodiments, once an identification for the particular user is obtained, it may be stored locally in memory of the TV meter. In some embodiments, the identification may be stored in a profile for the particular user such as profile 240.

In step 520, the TV meter determines television content that the particular user is currently watching on the television. The television content may include a show, a movie, an advertisement, an event (e.g., a sporting event, etc.), and the like. The identity of the television content may be determined using audio fingerprinting, video fingerprinting, analyzing signals on an HDMI cable, analyzing social content (e.g., posts, reactions, comments, etc.) by the determined user of step 510 to a social-networking system, analyzing a social-graph of a social-networking system (e.g., determining if any "watched" edges exits between nodes of the determined user and the particular television content), or any other appropriate method, including any method described in reference to system 100 above.

In step 530, the TV meter determines, using one or more sensors, multiple attention levels for the particular user while they are watching the television content. In some embodiments, each attention level indicates an amount of attention paid by the particular user to one of a plurality of segments of the television content. For example, if the particular user is watching a specific commercial that is fifteen seconds long, step 530 may determine an attention level for the particular user for each second of the commercial, which results in fifteen attention levels (i.e., one attention level for each second of the commercial). In some embodiments, each attention level is based on one or more of: a determined facial feature of the particular user; a determination that the television is powered on; and a determination that the particular user is within a predetermined distance of the television. The facial features may include, for example, eye status (e.g., open or closed), head pose, mouth positions, and eyebrow positions, as described above. In some embodiments, any other appropriate method disclosed herein, including any method described in reference to system 100 above, may be utilized by step 530 to determine multiple attention levels for the particular user while they are watching the television content.

In some embodiments, each attention level of step 530 is a logical "TRUE" (i.e., paying attention) or "FALSE" (i.e., not paying attention). For example, step 530 may utilize any Boolean operation such as those described in reference to FIG. 3 above to determine if the user is or is not paying attention to each segment of the watched television content. In some embodiments, step 530 may utilize the methods described in FIG. 4 to determine if the user is or is not paying attention to each segment of the watched television content. In those embodiments, the attention levels of step 530 may indicate an increase or decrease in typical attention levels for the particular user, or they may indicate any appropriate numerical quantification of attention by the particular user for the television content.

In some embodiments, method 500 utilizes any appropriate method to identify the plurality of segments of the television content of step 530. For example, some embodiments may utilize machine learning to identify and tag thematic elements in a video (e.g. animals, people speaking a certain language, landmarks, color palettes, etc.) along with timestamps where they are present in the video. For example, a clown may be identified by the machine learning as appearing in the eighth second of a fifteen-second commercial being watched by the particular user. Similarly, a puppy may be identified by the machine learning as appearing in the twelfth second of the fifteen-second commercial being watched by the particular user. In some embodiments, television content may simply be segmented into certain time segments. For example, a thirty-minute television show may be segmented into ten-second time segments. Any appropriate method may be used to identify and tag thematic elements in a video or to segment the video into certain time segments.

In step 540, one or more insights are provided for display on a display device. In some embodiments, each insight indicates a particular one of the determined attention levels of step 530 and a particular segment of the television content associated with the particular attention level. Using the examples for method 500 above, step 530 may determine that the particular user paid more attention than normal to puppy in the twelfth second of the fifteen-second commercial but paid less attention than normal to the clown in the eighth second of the fifteen-second commercial. One example of a provided insight from step 540 might therefore be: "The attention level of user 101A was more than normal for the puppy in the twelfth second of the fifteen-second commercial." Another example of a provided insight from step 540 might be: "User 101A looked away did not pay attention to the clown in the eighth second of the fifteen-second commercial." As a result, the advertiser may have a clearer picture of items to include or exclude from future commercials.

In some embodiments, method 500 determines, from the plurality of determined attention levels of step 530, a maximum or minimum attention level for the particular user for the television content, and the particular attention level of the provided insight of step 540 includes the maximum or minimum attention level. For example, using any appropriate method described herein, method 500 may determine that the particular user paid the most attention to the puppy in the twelfth second of the fifteen-second commercial they watched. As a result, method 500 may provide an insight in step 540 such as: "User 101A paid the most attention to the puppy in the twelfth second of the fifteen-second commercial." As another example, method 500 may provide an insight in step 540 such as: "User 101A paid the least attention to the clown in the eighth second of the fifteen-second commercial."

In some embodiments, a statistical technique may be utilized by method 500 to correlate demographic, psychographic, or behavioral data of users 101 with areas of attention or inattention. For example, social-networking system 160 may receive captured data 150 from multiple TV meters 110 that indicates demographic data for observed users and attention levels for the users as determined from step 530 above. Social-networking system 160 may correlate the received data and then provide insights such as: "The inclusion of a Mexican flag in the sixth second of the commercial caused a peak in attention in Spanish-speaking audiences that was sustained throughout the commercial." As another example, social-networking system 160 may provide insights such as: "The inclusion of a puppy in the twelfth second of the commercial caused a peak in attention in female audiences."

In some embodiments, method 500 may tag the visual or audio presence of brands, logos, or products in a video. For example, a logo of a known brand may be identified and tagged as appearing at a certain point in a television show. Using attention data from the TV meter for a particular user as described above, certain embodiments could then provide insights such as: "User 101A was paying attention when the logo of the known brand appeared in the video." As a result, third parties associated with the brand may have a better idea of how many people viewed their logo.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing insights based on determined attention levels of users including the particular steps of the method of FIG. 5, this disclosure contemplates any suitable method for providing insights based on determined attention levels of users including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
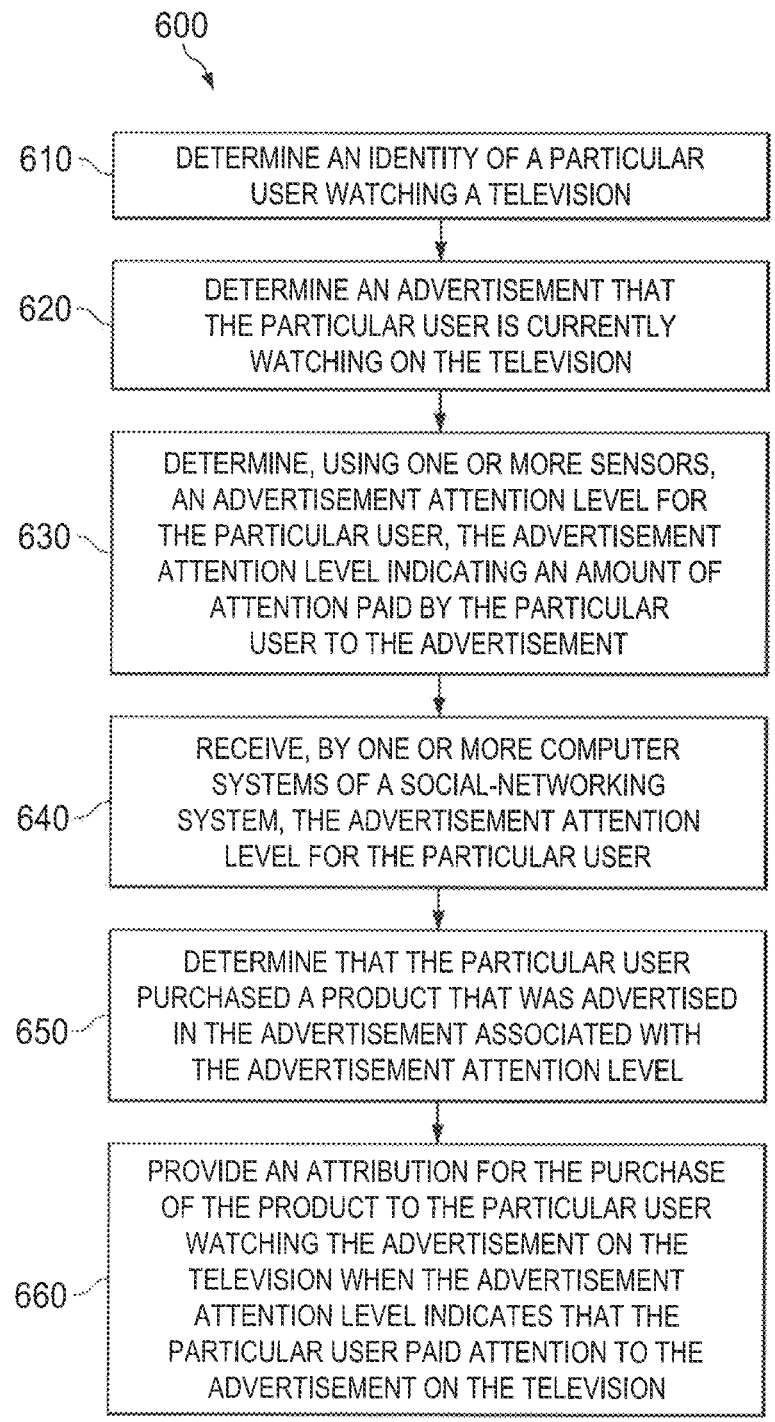
FIG. 6 illustrates an example method that may be utilized by the system of FIG. 1 to provide attribution for product purchases based on determined attention levels of users.

FIG. 6 illustrates an example method 600 for providing attribution for product purchases based on determined attention levels of users. In general, the goal of an attribution product is to assign full or partial credit for a particular business outcome (either positive, e.g., a purchase, or negative, e.g., a return) to the various advertisements that an individual saw before completing that outcome. Using either a rules-based or statistical system, the value of the outcome (e.g., the dollar value of the purchase) is portioned out to the advertisements the person saw in a fixed window of time prior to the outcome. By aggregating the assigned credit for each publisher, a business is able to understand which publishers are correlated with more or less of the particular outcome, and thus reallocate spending.

A typical approach for determining attribution is the "last click" method in which all credit for the outcome is assigned to the last advertisements the person saw before the outcome. Under this model, search advertisements often receive the greatest share of credit for purchases because people often use search engines to find an item they have already decided to purchase and then click on the advertisements in the search results because it is conveniently positioned. This demonstrates the weakness of simple attribution models as they often overstate the impact of certain classes of advertisements.

To address these and other problems with current attribution methods, embodiments described below in reference to FIG. 6 utilize determined attention levels of users by TV meters in order to assign attribution for product purchases. As a result, advertisers may have better picture of how to assign credit for particular business outcomes. While method 600 is described in reference to assigning attribution for product purchases based on determined attention levels of users, other embodiments can assign attribution for any behavior based on determined attention levels of users. For example, any behavior or action that can be measured or said to have occurred by a person at any time (e.g., returning a product, viewing a webpage, calling a phone number, etc.) can be attributed by some embodiments based on determined attention levels of users. This disclosure is not limited to solely assigning attribution for product purchases.

Method 600 may begin at step 610 where the TV meter determines an identity of a particular user watching the television. The identity of the particular user may be determined using facial recognition/detection, Wi-Fi scanning, BLUETOOTH, UPnP, or any other appropriate method, including any method described in reference to system 100 above. In some embodiments, step 610 may include cross-referencing any obtained identification for the particular user (e.g., MAC address, IP address, user ID, etc.) with user profiles of a social-networking system in order to determine the identity of the particular user watching the television. In some embodiments, once an identification for the particular user is obtained, it may be stored locally in memory of the TV meter. In some embodiments, the identification may be stored in a profile for the particular user such as profile 240.

In step 620, the TV meter determines an advertisement that the particular user is currently watching on the television. The identity of the advertisement may be determined using audio fingerprinting, video fingerprinting, analyzing signals on an HDMI cable, analyzing social content (e.g., posts, reactions, comments, etc.) by the determined user of step 610 to a social-networking system, analyzing a social-graph of a social-networking system (e.g., determining if any "like" edges exists between nodes of the determined user and the particular product of the advertisement), or any other appropriate method, including any method described in reference to system 100 above.

In step 630, the TV meter determines, using one or more sensors such as sensors 130, an advertisement attention level for the particular user. In some embodiments, the advertisement attention level indicates an amount of attention paid by the particular user to the advertisement of step 620. In some embodiments, each advertisement attention level is based on one or more of: a determined facial feature of the particular user; a determination that the television is powered on; and a determination that the particular user is within a predetermined distance of the television. The facial features may include, for example, eye status (e.g., open or closed), head pose, mouth positions, and eyebrow positions, as described above. In some embodiments, any other appropriate method disclosed herein, including any method described in reference to system 100 above, may be utilized by step 630 to determine an attention level for the particular user while they are watching the advertisement.

In some embodiments, each advertisement attention level of step 630 is a logical "TRUE" (i.e., paying attention) or "FALSE" (i.e., not paying attention). For example, step 630 may utilize any Boolean operation such as those described in reference to FIG. 3 above to determine if the user is or is not paying attention to the advertisement. In some embodiments, step 630 may utilize the methods described in FIG. 4 to determine if the user is or is not paying attention to the advertisement. In those embodiments, the attention levels of step 630 may indicate an increase or decrease in typical attention levels for the particular user, or they may indicate any appropriate numerical quantification of attention by the particular user for the advertisement.

In step 640, one or more computer systems of a social-networking system receive the advertisement attention level from step 630 for the particular user from the TV meter device. In some embodiments, the TV meter device sends the advertisement attention level from step 630 to the one or more computer systems of a social-networking system either directly or indirectly. In other embodiments, the TV meter device stores the advertisement attention level from step 630 in memory that is accessible by the one or more computer systems of a social-networking system.

In step 650, the one or more computer systems of the social-networking system determine that the particular user purchased a product that was advertised in the advertisement associated with the advertisement attention level. In some embodiments, this step includes first determining a specific product associated with the advertisement. In some embodiments, the social-networking system utilizes audio fingerprinting, machine learning, tag analysis, metadata analysis, or any other appropriate method to determine a specific product associated with the advertisement. For example, the social-networking system may utilize audio fingerprinting to match the advertisement to an advertisement for a known product. Next, the social-networking system may determine that the particular user purchased the product associated with the advertisement. In some embodiments, for example, the social-networking system may analyze a social graph of the social-networking system to determine if the particular user purchased the product associated with the advertisement. This may include, for example, analyzing posts, comments, reactions, edges, etc. For example, if the particular user submits a post that reads "I love my new Oculus Rift," the social-networking system may determine the particular user purchased an Oculus Rift.

In step 660, the one or more computer systems of the social-networking system provide an attribution for the purchase of the product to the particular user watching the advertisement on the television when the advertisement attention level indicates that the particular user paid attention to the advertisement on the television. For example, if the advertisement attention level received in step 640 indicates that the particular user paid attention to the advertisement of step 620 (e.g., advertisement attention level of "TRUE"), the social-networking system may attribute the user's purchase of the product determined in step 650 to the advertisement determined in step 620.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for providing attribution for product purchases based on determined attention levels of users including the particular steps of the method of FIG. 6, this disclosure contemplates any suitable method for providing attribution for product purchases based on determined attention levels of users including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
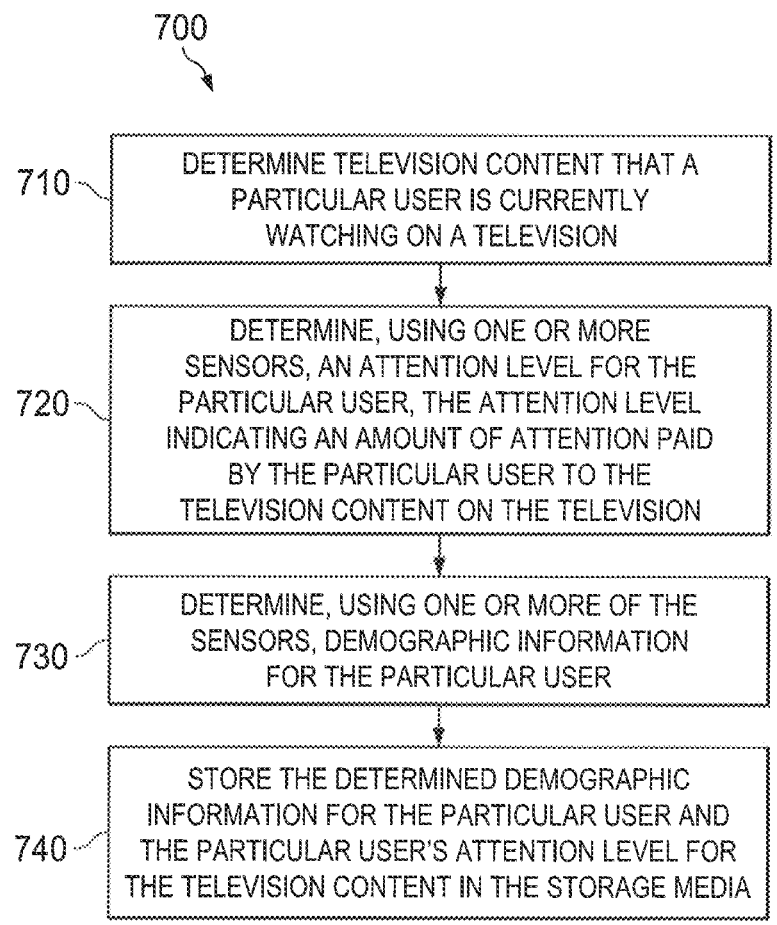
FIG. 7 illustrates an example method that may be utilized by the system of FIG. 1 to provide a planning product based on determined demographics and attention levels of users.

FIG. 7 illustrates an example method 700 for providing a planning product based on determined demographics and attention levels of users. Method 700 may begin at step 710 where the TV meter determines television content that the particular user is currently watching on the television. The television content may include a show, a movie, an advertisement, an event (e.g., a sporting event, etc.), and the like. The identity of the television content may be determined using audio fingerprinting, video fingerprinting, analyzing signals on an HDMI cable, analyzing social content (e.g., posts, reactions, comments, etc.) by the determined user of step 710 to a social-networking system, analyzing a social-graph of a social-networking system (e.g., determining if any "watched" edges exits between nodes of the determined user and the particular television content), or any other appropriate method, including any method described in reference to system 100 above.

In step 720, the TV meter determines, using one or more sensors such as sensors 130, an attention level for the particular user. In some embodiments, the attention level indicates an amount of attention paid by the particular user to the television content of step 710. In some embodiments, each attention level is based on one or more of: a determined facial feature of the particular user; a determination that the television is powered on; and a determination that the particular user is within a predetermined distance of the television. The facial features may include, for example, eye status (e.g., open or closed), head pose, mouth positions, and eyebrow positions, as described above. In some embodiments, any other appropriate method disclosed herein, including any method described in reference to system 100 above, may be utilized by step 720 to determine an attention level for the particular user while they are watching the television content.

In some embodiments, each attention level of step 720 is a logical "TRUE" (i.e., paying attention) or "FALSE" (i.e., not paying attention). For example, step 720 may utilize any Boolean operation such as those described in reference to FIG. 3 above to determine if the user is or is not paying attention to the advertisement. In some embodiments, step 720 may utilize the methods described in FIG. 4 to determine if the user is or is not paying attention to the advertisement. In those embodiments, the attention levels of step 720 may indicate an increase or decrease in typical attention levels for the particular user, or they may indicate any appropriate numerical quantification of attention by the particular user for the advertisement.

In step 730, the TV meter determines, using one or more sensors, demographic information for the particular user. For example, step 730 may include determining a probable race, gender, age, etc. of the particular user using one or more sensors. As one example, one or more images captured by a camera of the TV meter may be compared by the TV meter (or a social-networking system) to images of people with known demographics. For example, if a face of the particular user in an image captured by the TV meter matches (or is comparable to a certain degree) to a face in an image of a known female of a particular race and age, the TV meter or the social-networking system may determine that the particular user is also a female of the particular race and age. In some embodiments, if the particular user is associated with an account at the social-networking system, demographics of the particular user may be obtained from a user profile of the user at the social-networking system. In some embodiments, any other appropriate method disclosed herein, including any method described in reference to system 100 above, may be utilized by step 730 to determine demographic information for the particular user.

At step 740, the determined demographic information of step 730 for the particular user and the particular user's attention level from step 720 are stored in memory of the TV meter. In some embodiments, the determined demographic information of step 730 for the particular user and the particular user's attention level from step 720 are stored in any network-accessible memory so that it may be accessed by the social-networking system.

In some embodiments, method 700 further includes receiving, by the social-networking system from the TV meter, the determined demographic information of step 730 for the particular user and the particular user's attention level from step 720 for the television content of step 710. Once the determined demographic information of step 730 for the particular user and the particular user's attention level from step 720 for the television content of step 710 are received, the social-networking system may generate a demographic attention profile for the television content of step 710 by aggregating the received demographic information for the particular user and the particular user's attention level for the television content with stored information from other TV meters about the television content. In some embodiments, the demographic attention profile indicates one or more trends between certain demographics of users and the television content. For example, the demographic attention profile for the television content of step 710 may indicate which genders, races, ages, etc. are most likely to pay attention to the television content.

In some embodiments, method 700 further includes generating, based on the demographic attention profile, a suggested targeting criteria for display to a third party associated with the television content. The third party may be, for example, an advertiser, producer, product owner, television executive, etc. In some embodiments, the suggested targeting criteria indicates particular demographics of users to target for future advertising regarding the television content. For example, if the demographic attention profile for the television content indicates that females between the ages of 18-34 paid the most attention to the television content, the displayed suggested targeting criteria may be to target females between the ages of 18-34. Conversely, if the demographic attention profile for the television content indicates that males paid the least amount of attention to the television content, the displayed suggested targeting criteria may be to avoid targeting males for future advertising.

In some embodiments, method 700 further includes determining previous targeting criteria for the television content and displaying, to the third party associated with the television content, the previous targeting criteria along with the suggested targeting criteria. For example, the social-networking system may determine that the third party previously targeted males between the ages of 18-34 for a specific advertisement. However, if the demographic attention profile for the television content indicates that females between the ages of 18-34 paid the most attention to the advertisement, the social-networking system may display "You targeted males between the ages of 18-34 previously for this advertisement, but we suggest targeting females between the ages of 18-34 in the future for this advertisement."

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for providing a planning product based on determined demographics and attention levels of user including the particular steps of the method of FIG. 7, this disclosure contemplates any suitable method for providing a planning product based on determined demographics and attention levels of users including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
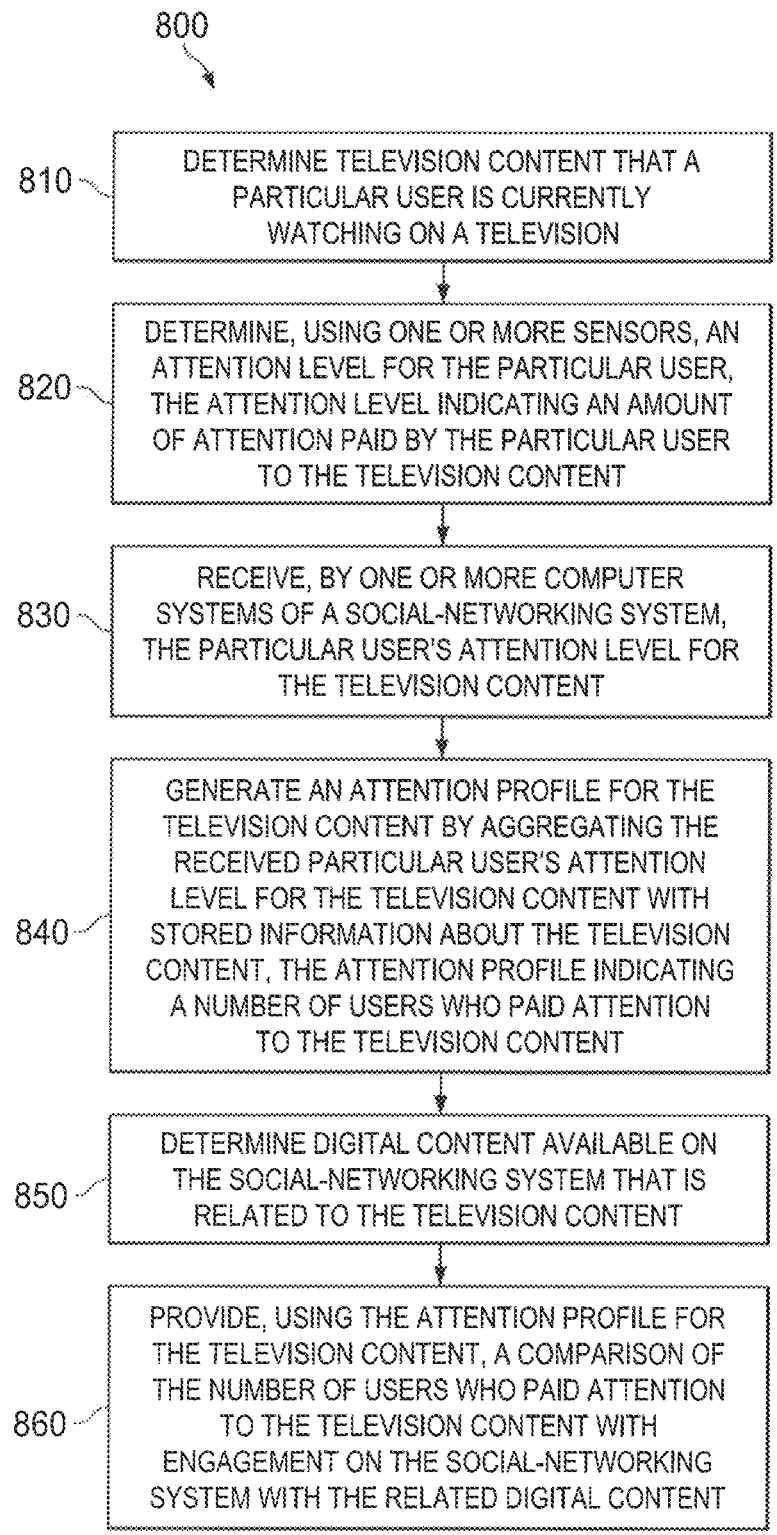
FIG. 8 illustrates an example method that may be utilized by the system of FIG. 1 to provide a comparison of the reach of digital and television content based on attention levels of users.

FIG. 8 illustrates an example method 800 for providing a comparison of the reach of digital and television content based on attention levels of users. In general, the goal of a reach product is to determine how many people an advertisement reached ("the reach") and how many times it was shown to them ("the frequency"). Additionally, a reach product may include additional information on whether the advertisement reached the audience it was intended to reach. For instance, if the goal of an advertisement is to reach 18-34 year old men in a particular zip code, a reach product might report that 70% of advertisements were correctly shown to this group and 30% were wasted by being shown to people outside this category. The determination of which individuals fall in or out of this targeting criteria would be based on information about those users, such as user-specified date of birth and gender, but also including inferred values based on behavior, social graph, device geolocation, IP address, panel data, etc. The percentage of users whose attributes match the desired targeting specification is often called the "on-target rate." Current reach methods, however are lacking in that they do not provide a comparison of the reach of digital and television content. Embodiments of method 800 described below provide enhancements to current reach analysis by utilizing attention levels of users as determined by TV meters to provide a comparison of the reach of digital and television content. As a result, advertisers may be better able to distribute their advertising spending in such a way that they reach their audience (on either platform or both) for the lowest cost. Similarly, advertisers can understand how best to achieve a particular frequency or distribution of ad exposure based on the overlap of targeted populations on certain TV channels or networks and online publishers.

Method 800 may begin at step 810 where the TV meter determines television content that the particular user is currently watching on a television. The television content may include a show, a movie, an advertisement, an event (e.g., a sporting event, etc.), and the like. The identity of the television content may be determined using audio fingerprinting, video fingerprinting, analyzing signals on an HDMI cable, analyzing social content (e.g., posts, reactions, comments, etc.) by the determined user of step 810 to a social-networking system, analyzing a social-graph of a social-networking system (e.g., determining if any "watched" edges exits between nodes of the determined user and the particular television content), or any other appropriate method, including any method described in reference to system 100 above.

In step 820, the TV meter determines, using one or more sensors such as sensors 130, an attention level for the particular user. In some embodiments, the attention level indicates an amount of attention paid by the particular user to the television content of step 810. In some embodiments, each attention level is based on one or more of: a determined facial feature of the particular user; a determination that the television is powered on; and a determination that the particular user is within a predetermined distance of the television. The facial features may include, for example, eye status (e.g., open or closed), head pose, mouth positions, and eyebrow positions, as described above. In some embodiments, any other appropriate method disclosed herein, including any method described in reference to system 100 above, may be utilized by step 820 to determine an attention level for the particular user while they are watching the television content.

In some embodiments, each attention level of step 820 is a logical "TRUE" (i.e., paying attention) or "FALSE" (i.e., not paying attention). For example, step 820 may utilize any Boolean operation such as those described in reference to FIG. 3 above to determine if the user is or is not paying attention to the television content. In some embodiments, step 820 may utilize the methods described in FIG. 4 to determine if the user is or is not paying attention to the television content. In those embodiments, the attention levels of step 820 may indicate an increase or decrease in typical attention levels for the particular user, or they may indicate any appropriate numerical quantification of attention by the particular user for the television content.

At step 830, a social-networking system receives, from the TV meter device, the particular user's attention level of step 820 for the specific television content of step 810. At step 840, the social-networking system generates an attention profile for the specific television content of step 810 by aggregating the received particular user's attention level for the specific television content with stored information from other TV meters about the specific television content. In some embodiments, the attention profile indicates a number of users who paid attention to the television content. The attention profile may also indicate demographics of the users who paid attention to the television content.

At step 850, the social-networking system determines digital content available on the social-networking system that is related to the specific television content of step 810. For example, if the specific television content of step 810 is a certain television show, the social-networking system determines any available digital content (e.g., videos, pages, etc.) on the social-networking system for the certain television show. The digital content may be a story, a post, a video, a comment, or any other available digital content on the social-networking system.

At step 860, the social-networking system provides, using the attention profile for the television content, a comparison of the number of users who paid attention to the television content of step 840 with engagement on the social-networking system with the related digital content of step 850. In some embodiments, the engagement on the social-networking system with the related digital content is determined by analyzing a social graph of the social-networking system to determine one or more of: a number of users of the social-networking system who shared or reacted to posts or stories associated with the related digital content; a number of users of the social-networking system who watched the related digital content on the social-networking system; and a number of users of the social-networking system who posted stories or comments about the related digital content. The provided comparison of this step may be, for example: "10,000 people viewed the advertisement on television and 8,000 people viewed the advertisement on the social-networking system."

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for providing a comparison of the reach of digital and television content based on attention levels of users including the particular steps of the method of FIG. 8, this disclosure contemplates any suitable method for providing a comparison of the reach of digital and television content based on attention levels of users including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
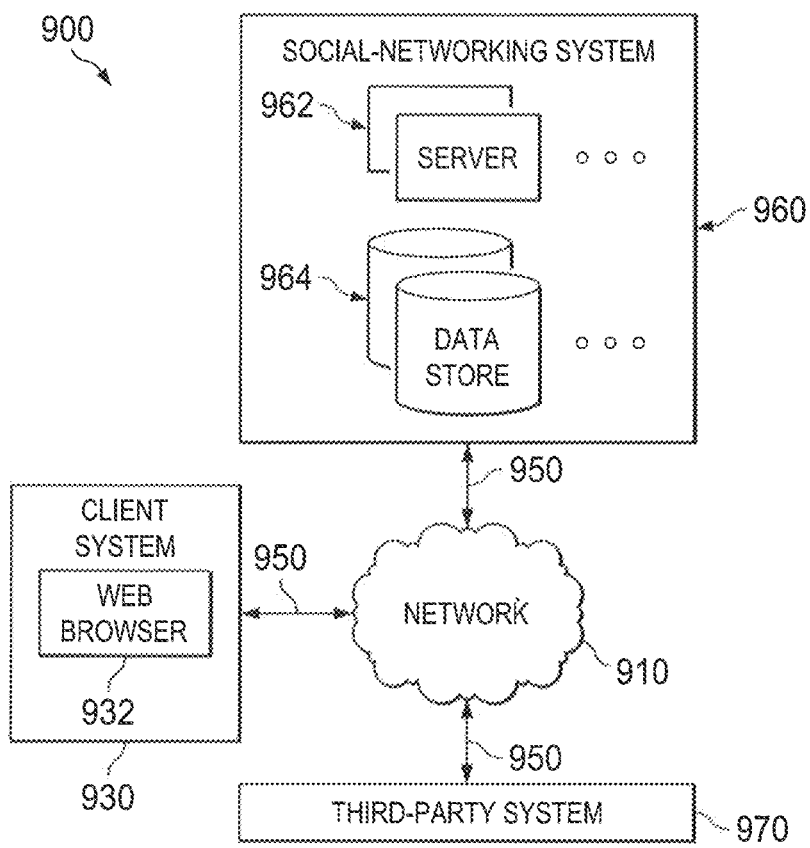
FIG. 9 illustrates an example network environment associated with a social-networking system.

FIG. 9 illustrates an example network environment 900 associated with a social-networking system. Network environment 900 includes a client system 930, a social-networking system 960, and a third-party system 970 connected to each other by a network 910. Although FIG. 9 illustrates a particular arrangement of client system 930, social-networking system 960, third-party system 970, and network 910, this disclosure contemplates any suitable arrangement of client system 930, social-networking system 960, third-party system 970, and network 910. As an example and not by way of limitation, two or more of client system 930, social-networking system 960, and third-party system 970 may be connected to each other directly, bypassing network 910. As another example, two or more of client system 930, social-networking system 960, and third-party system 970 may be physically or logically co-located with each other in whole or in part. Moreover, although FIG. 9 illustrates a particular number of client systems 930, social-networking systems 960, third-party systems 970, and networks 910, this disclosure contemplates any suitable number of client systems 930, social-networking systems 960, third-party systems 970, and networks 910. As an example and not by way of limitation, network environment 900 may include multiple client system 930, social-networking systems 960, third-party systems 970, and networks 910.

This disclosure contemplates any suitable network 910. As an example and not by way of limitation, one or more portions of network 910 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 910 may include one or more networks 910.

Links 950 may connect client system 930, social-networking system 960, and third-party system 970 to communication network 910 or to each other. This disclosure contemplates any suitable links 950. In particular embodiments, one or more links 950 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 950 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 950, or a combination of two or more such links 950. Links 950 need not necessarily be the same throughout network environment 900. One or more first links 950 may differ in one or more respects from one or more second links 950.

In particular embodiments, client system 930 may be an electronic device including hardware, software, or embedded logic components or a combination of two or more such components and capable of carrying out the appropriate functionalities implemented or supported by client system 930. As an example and not by way of limitation, a client system 930 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 930. A client system 930 may enable a network user at client system 930 to access network 910. A client system 930 may enable its user to communicate with other users at other client systems 930.

In particular embodiments, client system 930 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 930 may enter a Uniform Resource Locator (URL) or other address directing the web browser 932 to a particular server (such as server 962, or a server associated with a third-party system 970), and the web browser 932 may generate a Hyper Text Transfer Protocol (HTTP) request and communicate the HTTP request to server. The server may accept the HTTP request and communicate to client system 930 one or more Hyper Text Markup Language (HTML) files responsive to the HTTP request. Client system 930 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 960 may be a network-addressable computing system that can host an online social network. Social-networking system 960 may generate, store, receive, and send social-networking data, such as, for example, user-profile data, concept-profile data, social-graph information, or other suitable data related to the online social network. Social-networking system 960 may be accessed by the other components of network environment 900 either directly or via network 910. As an example and not by way of limitation, client system 930 may access social-networking system 960 using a web browser 932, or a native application associated with social-networking system 960 (e.g., a mobile social-networking application, a messaging application, another suitable application, or any combination thereof) either directly or via network 910. In particular embodiments, social-networking system 960 may include one or more servers 962. Each server 962 may be a unitary server or a distributed server spanning multiple computers or multiple datacenters. Servers 962 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 962 may include hardware, software, or embedded logic components or a combination of two or more such components for carrying out the appropriate functionalities implemented or supported by server 962. In particular embodiments, social-networking system 960 may include one or more data stores 964. Data stores 964 may be used to store various types of information. In particular embodiments, the information stored in data stores 964 may be organized according to specific data structures. In particular embodiments, each data store 964 may be a relational, columnar, correlation, or other suitable database. Although this disclosure describes or illustrates particular types of databases, this disclosure contemplates any suitable types of databases. Particular embodiments may provide interfaces that enable a client system 930, a social-networking system 960, or a third-party system 970 to manage, retrieve, modify, add, or delete, the information stored in data store 964.

In particular embodiments, social-networking system 960 may store one or more social graphs in one or more data stores 964. In particular embodiments, a social graph may include multiple nodes—which may include multiple user nodes (each corresponding to a particular user) or multiple concept nodes (each corresponding to a particular concept)—and multiple edges connecting the nodes. Social-networking system 960 may provide users of the online social network the ability to communicate and interact with other users. In particular embodiments, users may join the online social network via social-networking system 960 and then add connections (e.g., relationships) to a number of other users of social-networking system 960 to whom they want to be connected. Herein, the term "friend" may refer to any other user of social-networking system 960 with whom a user has formed a connection, association, or relationship via social-networking system 960.

In particular embodiments, social-networking system 960 may provide users with the ability to take actions on various types of items or objects, supported by social-networking system 960. As an example and not by way of limitation, the items and objects may include groups or social networks to which users of social-networking system 960 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 960 or by an external system of third-party system 970, which is separate from social-networking system 960 and coupled to social-networking system 960 via a network 910.

In particular embodiments, social-networking system 960 may be capable of linking a variety of entities. As an example and not by way of limitation, social-networking system 960 may enable users to interact with each other as well as receive content from third-party systems 970 or other entities, or to allow users to interact with these entities through an application programming interfaces (API) or other communication channels.

In particular embodiments, a third-party system 970 may include one or more types of servers, one or more data stores, one or more interfaces, including but not limited to APIs, one or more web services, one or more content sources, one or more networks, or any other suitable components, e.g., that servers may communicate with. A third-party system 970 may be operated by a different entity from an entity operating social-networking system 960. In particular embodiments, however, social-networking system 960 and third-party systems 970 may operate in conjunction with each other to provide social-networking services to users of social-networking system 960 or third-party systems 970. In this sense, social-networking system 960 may provide a platform, or backbone, which other systems, such as third-party systems 970, may use to provide social-networking services and functionality to users across the Internet.

In particular embodiments, a third-party system 970 may include a third-party content object provider. A third-party content object provider may include one or more sources of content objects, which may be communicated to a client system 930. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 960 also includes user-generated content objects, which may enhance a user's interactions with social-networking system 960. User-generated content may include anything a user can add, upload, send, or "post" to social-networking system 960. As an example and not by way of limitation, a user communicates posts to social-networking system 960 from a client system 930. Posts may include data such as status updates or other textual data, location information, photos, videos, links, music or other similar data or media. Content may also be added to social-networking system 960 by a third-party through a "communication channel," such as a newsfeed or stream.

In particular embodiments, social-networking system 960 may include a variety of servers, sub-systems, programs, modules, logs, and data stores. In particular embodiments, social-networking system 960 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 960 may also include suitable components such as network interfaces, security mechanisms, load balancers, failover servers, management-and-network-operations consoles, other suitable components, or any suitable combination thereof. In particular embodiments, social-networking system 960 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 960 to one or more client systems 930 or one or more third-party system 970 via network 910. The web server may include a mail server or other messaging functionality for receiving and routing messages between social-networking system 960 and one or more client systems 930. An API-request server may allow a third-party system 970 to access information from social-networking system 960 by calling one or more APIs. An action logger may be used to receive communications from a web server about a user's actions on or off social-networking system 960. In conjunction with the action log, a third-party-content-object log may be maintained of user exposures to third-party-content objects. A notification controller may provide information regarding content objects to a client system 930. Information may be pushed to a client system 930 as notifications, or information may be pulled from client system 930 responsive to a request received from client system 930. Authorization servers may be used to enforce one or more privacy settings of the users of social-networking system 960. A privacy setting of a user determines how particular information associated with a user can be shared. The authorization server may allow users to opt in to or opt out of having their actions logged by social-networking system 960 or shared with other systems (e.g., third-party system 970), such as, for example, by setting appropriate privacy settings. Third-party-content-object stores may be used to store content objects received from third parties, such as a third-party system 970. Location stores may be used for storing location information received from client systems 930 associated with users. Advertisement-pricing modules may combine social information, the current time, location information, or other suitable information to provide relevant advertisements, in the form of notifications, to a user.

Figure 10:
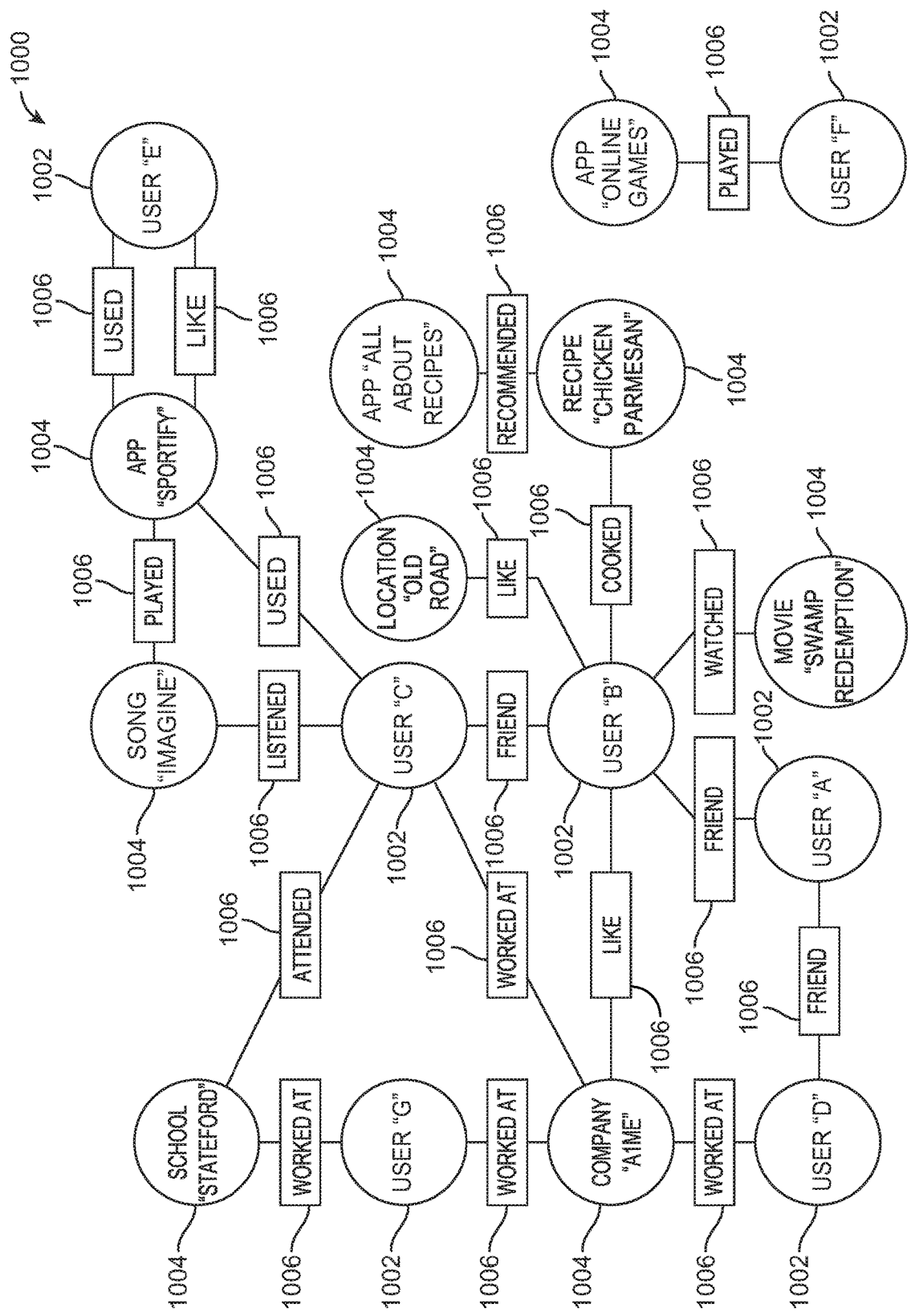
FIG. 10 illustrates an example social graph.

FIG. 10 illustrates example social graph 1000. In particular embodiments, social-networking system 960 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social-networking system 960, client system 930, or third-party system 970 may access social graph 1000 and related social-graph information for suitable applications. The nodes and edges of social graph 1000 may be stored as data objects, for example, in a data store (such as a social-graph database). Such a data store may include one or more searchable or queryable indexes of nodes or edges of social graph 1000.

In particular embodiments, a user node 1002 may correspond to a user of social-networking system 960. As an example and not by way of limitation, a user may be an individual (human user), an entity (e.g., an enterprise, business, or third-party application), or a group (e.g., of individuals or entities) that interacts or communicates with or over social-networking system 960. In particular embodiments, when a user registers for an account with social-networking system 960, social-networking system 960 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social-networking system 960. In particular embodiments, a user node 1002 may be associated with information provided by a user or information gathered by various systems, including social-networking system 960. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more webpages.

In particular embodiments, a concept node 1004 may correspond to a concept. As an example and not by way of limitation, a concept may correspond to a place (such as, for example, a movie theater, restaurant, landmark, or city); a website (such as, for example, a website associated with social-network system 960 or a third-party website associated with a web-application server); an entity (such as, for example, a person, business, group, sports team, or celebrity); a resource (such as, for example, an audio file, video file, digital photo, text file, structured document, or application) which may be located within social-networking system 960 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1004 may be associated with information of a concept provided by a user or information gathered by various systems, including social-networking system 960. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social-networking system 960. Profile pages may also be hosted on third-party websites associated with a third-party system 970. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 970. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 930 to send to social-networking system 960 a message indicating the user's action. In response to the message, social-networking system 960 may create an edge (e.g., a check-in-type edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social-networking system 960 may send a "friend request" to the second user. If the second user confirms the "friend request," social-networking system 960 may create an edge 1006 connecting the first user's user node 1002 to the second user's user node 1002 in social graph 1000 and store edge 1006 as social-graph information in one or more of data stores 964. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," "purchased," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social-networking system 960 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 960 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social-networking system 960 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004).

In particular embodiments, social-networking system 960 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 930) may indicate that he or she likes the concept represented by the concept node 1004 by clicking or selecting a "Like" icon, which may cause the user's client system 930 to send to social-networking system 960 a message indicating the user's liking of the concept associated with the concept-profile page. In response to the message, social-networking system 960 may create an edge 1006 between user node 1002 associated with the user and concept node 1004, as illustrated by "like" edge 1006 between the user and concept node 1004. In particular embodiments, social-networking system 960 may store an edge 1006 in one or more data stores. In particular embodiments, an edge 1006 may be automatically formed by social-networking system 960 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, social-networking system 960 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 970 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 960 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 960 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 960 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 960 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 960 may calculate a coefficient based on a user's actions. Social-networking system 960 may monitor such actions on the online social network, on a third-party system 970, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 960 may calculate a coefficient based on the user's actions with particular types of content. The content may be associated with the online social network, a third-party system 970, or another suitable system. The content may include users, profile pages, posts, news stories, headlines, instant messages, chat room conversations, emails, advertisements, pictures, video, music, other suitable objects, or any combination thereof. Social-networking system 960 may analyze a user's actions to determine whether one or more of the actions indicate an affinity for subject matter, content, other users, and so forth. As an example and not by way of limitation, if a user frequently posts content related to "coffee" or variants thereof, social-networking system 960 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 960 may calculate a coefficient based on the type of relationship between particular objects. Referencing the social graph 1000, social-networking system 960 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 960 may determine that the user has a higher coefficient with respect to the first photo than the second photo because having a tagged-in-type relationship with content may be assigned a higher weight and/or rating than having a like-type relationship with content. In particular embodiments, social-networking system 960 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 960 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social-networking system 960 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 930 of the user). A first user may be more interested in other users or concepts that are closer to the first user. As an example and not by way of limitation, if a user is one mile from an airport and two miles from a gas station, social-networking system 960 may determine that the user has a higher coefficient for the airport than the gas station based on the proximity of the airport to the user.

In particular embodiments, social-networking system 960 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 960 may provide information that is relevant to user's interests and current circumstances, increasing the likelihood that they will find such information of interest. In particular embodiments, social-networking system 960 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 960 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 960 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 970 (e.g., via an API or other communication channel), or from another suitable system. In response to the request, social-networking system 960 may calculate the coefficient (or access the coefficient information if it has previously been calculated and stored). In particular embodiments, social-networking system 960 may measure an affinity with respect to a particular process. Different processes (both internal and external to the online social network) may request a coefficient for a particular object or set of objects. Social-networking system 960 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social-networking system 960 or shared with other systems (e.g., third-party system 970). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 970, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 962 may be authorization/privacy servers for enforcing privacy settings. In response to a request from a user (or other entity) for a particular object stored in a data store 964, social-networking system 960 may send a request to the data store 964 for the object. The request may identify the user associated with the request and may only be sent to the user (or a client system 930 of the user) if the authorization server determines that the user is authorized to access the object based on the privacy settings associated with the object. If the requesting user is not authorized to access the object, the authorization server may prevent the requested object from being retrieved from the data store 964, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 11:
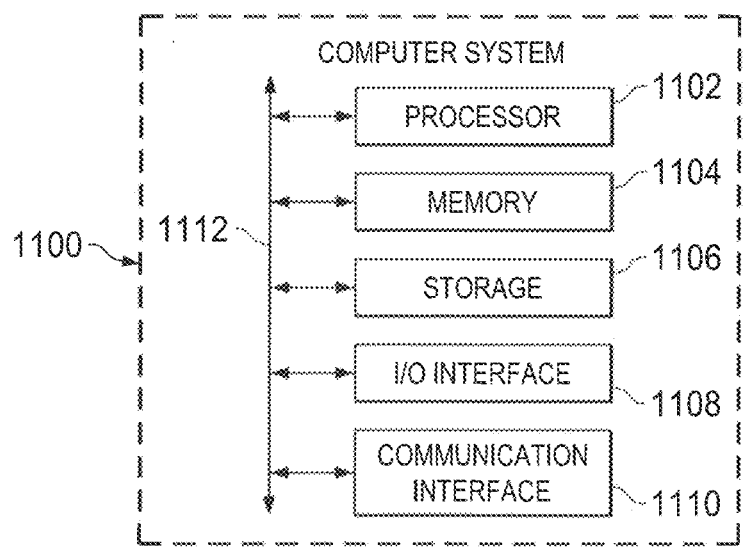
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
   one or more processors;
   a plurality of sensors; and
   one or more computer readable non-transitory storage media communicatively coupled to the one or more processors, the media comprising instructions operable when executed by the one or more processors to cause the system to:
   determine television content that a particular user is currently watching on the television;
   determine an identity of the particular user by comparing data captured by at least one of the plurality of sensors with data from a social graph, wherein the captured data comprises a device identification obtained from Wi-Fi or Bluetooth:
   determine, using one or more of the sensors, an attention level for the particular user, the attention level indicating an amount of attention paid by the particular user to the television content on the television;
   determine, using one or more of the sensors, demographic information for the particular user;
   store the determined demographic information for the particular user and the particular user's attention level for the television content in the storage media;
   generate a demographic attention profile for the television content by aggregating the stored demographic information for the particular user and the particular user's attention level for the television content with stored information about the television content from a plurality of other users, the demographic attention profile indicating one or more trends between certain demographics of users and the television content;
   generate, based on the demographic attention profile, a suggested targeting criteria; and
   provide, for display to a third party associated with the television content, the suggested targeting criteria along with a previous targeting criteria, wherein the suggested targeting criteria indicates a particular demographic to target for future advertising that is different from a demographic of the previous targeting criteria.

2. The system of claim 1, wherein the attention level is based at least on one or more of:
   a determination that eyes of the particular user are open for a predetermined amount of time;
   a determination that a head pose of the particular user is towards the television;
   a determination that the television is powered on; and
   a determination that the particular user is within a predetermined distance of the television.

3. The system of claim 1, wherein:
   the plurality of sensors comprises a camera; and
   determining, using one or more of the sensors, demographic information for the particular user comprises comparing an image of the particular user's face captured by the camera with a plurality of stored images.

4. The system of claim 1, wherein the television content comprises:
   a show;
   a movie;
   an advertisement; or
   an event.

5. The system of claim 1, wherein the social graph comprises a plurality of nodes and a plurality of edges connecting the plurality of nodes, the plurality of nodes comprising:
   a plurality of user nodes that are each associated with a user of a social-networking system; and
   a plurality of content nodes that are each associated with particular media content.

6. The system of claim 1, wherein the device identification comprises a MAC address or an IP address.

7. A method, by one or more computing devices, comprising:
   determining television content that a particular user is currently watching on a television;
   determining an identity of the particular user by comparing data captured by at least one of a plurality of sensors with data from a social graph, wherein the captured data comprises a device identification obtained from Wi-Fi or Bluetooth:
   determining, using one or more of the plurality of sensors, an attention level for the particular user, the attention level indicating an amount of attention paid by the particular user to the television content on the television;
   determining, using one or more of the plurality of sensors, demographic information for the particular user;
   storing the determined demographic information for the particular user and the particular user's attention level for the television content in storage media; and
   generating a demographic attention profile for the television content by aggregating the stored demographic information for the particular user and the particular user's attention level for the television content with stored information about the television content from a plurality of other users, the demographic attention profile indicating one or more trends between certain demographics of users and the television content;

generating, based on the demographic attention profile, a suggested targeting criteria; and providing, for display to a third party associated with the television content, the suggested targeting criteria along with a previous targeting criteria, wherein the suggested targeting criteria indicates a particular demographic to target for future advertising that is different from a demographic of the previous targeting criteria.

8. The method of claim 7, wherein the attention level is based at least on one or more of:

a determination that eyes of the particular user are open for a predetermined amount of time;

a determination that a head pose of the particular user is towards the television;

a determination that the television is powered on; and a determination that the particular user is within a predetermined distance of the television.

9. The method of claim 7, wherein:

the plurality of sensors comprises a camera; and determining, using one or more of the sensors, demographic information for the particular user comprises comparing an image of the particular user's face captured by the camera with a plurality of stored images.

10. The method of claim 7, wherein the television content comprises:

a show;

a movie;

an advertisement; or an event.

11. One or more computer-readable non-transitory storage media embodying software that is operable when executed to:

determine television content that a particular user is currently watching on a television;

determining an identity of the particular user by comparing data captured by at least one of a plurality of sensors with data from a social graph; wherein the captured data comprises a device identification obtained from Wi-Fi or Bluetooth;

determine, using one or more of the plurality of sensors, an attention level for the particular user, the attention level indicating an amount of attention paid by the particular user to the television content of the television;

determine, using one or more of the plurality of sensors, demographic information for the particular user;

store the determined demographic information for the particular user and the particular user's attention level for the television content in the storage media; and generate a demographic attention profile for the television content by aggregating the stored demographic information for the particular user and the particular user's attention level for the television content with stored information about the television content from a plurality of other users, the demographic attention profile indicating one or more trends between certain demographics of users and the television content;

generate, based on the demographic attention profile, a suggested targeting criteria; and provide, for display to a third party associated with the television content, the suggested targeting criteria along with a previous targeting criteria, wherein the suggested targeting criteria indicates a particular demographic to target for future advertising that is different from a demographic of the previous targeting criteria.

12. The storage media of claim 11, wherein the attention level is based at least on one or more of:

a determination that eyes of the particular user are open for a predetermined amount of time;

a determination that a head pose of the particular user is towards the television;

a determination that the television is powered on; and a determination that the particular user is within a predetermined distance of the television.

13. The storage media of claim 12, wherein:

the plurality of sensors comprises a camera; and determining, using one or more of the sensors, demographic information for the particular user comprises comparing an image of the particular user's face captured by the camera with a plurality of stored images.

* * * * *